(12) United States Patent
Burbine et al.

(10) Patent No.: US 12,346,702 B1
(45) Date of Patent: Jul. 1, 2025

(54) SYSTEMS AND METHODS FOR THE RECONFIGURATION OF LEGACY MACHINES USED IN MANUFACTURING ENVIRONMENTS TO GENERATE REAL-TIME OPERATIONAL DATA FOR USE IN ANALYTICS PROCESSES

(71) Applicant: B&D Industrial Inc., Macon, GA (US)

(72) Inventors: Mark Burbine, Bloomfield, NJ (US); Stephen Figurski, Lawrenceville, GA (US)

(73) Assignee: B&D INDUSTRIAL INC., Macon, GA (US)

( * ) Notice: Subject to any disclaimer, the term of this patent is extended or adjusted under 35 U.S.C. 154(b) by 366 days.

(21) Appl. No.: 17/952,391

(22) Filed: Sep. 28, 2022

Related U.S. Application Data

(60) Provisional application No. 63/251,386, filed on Oct. 1, 2021.

(51) Int. Cl.
*G06F 9/44* (2018.01)
*G06F 9/445* (2018.01)
*G06Q 50/04* (2012.01)

(52) U.S. Cl.
CPC ......... *G06F 9/44505* (2013.01); *G06Q 50/04* (2013.01)

(58) Field of Classification Search
CPC ................. G06F 1/12; G06F 9/44; G06F 1/32
See application file for complete search history.

(56) References Cited

U.S. PATENT DOCUMENTS

| | | | |
|---|---|---|---|
| 11,360,750 B1* | 6/2022 | Corvi | G06F 8/48 |
| 2012/0142425 A1* | 6/2012 | Scott | G07F 17/3227 463/42 |

\* cited by examiner

*Primary Examiner* — Keshab R Pandey
(74) *Attorney, Agent, or Firm* — Thomas | Horstemeyer, LLP

(57) ABSTRACT

Methods and systems are provided for generating reconfiguration instructions for reconfiguring at least one legacy machine in accordance with a reconfiguration event. The method includes employing at least one of a computer and a user to identify a manufacturing or assembly environment having the at least one legacy machine, the at least one legacy machine requiring reconfiguration for generation of real-time operational data and reporting capabilities, the reporting capabilities including collection and processing of a real-time data stream derived from operation of the at one legacy machine during a manufacturing or assembly process operational within the manufacturing or assembly environment, the manufacturing or assembly process producing at least one product; employing at least one of the computer and the user to collect information associated with each of (i) the at least one legacy machine, (ii) the manufacturing or assembly environment, and (iii) the manufacturing or assembly process; and employing at least one of a reconfiguration engine and the user to generate the reconfiguration instructions.

20 Claims, 2 Drawing Sheets

SYSTEMS AND METHODS FOR THE RECONFIGURATION OF LEGACY MACHINES USED IN MANUFACTURING ENVIRONMENTS TO GENERATE REAL-TIME OPERATIONAL DATA FOR USE IN ANALYTICS PROCESSES

CROSS-REFERENCE TO RELATED APPLICATIONS

This application claims priority to U.S. Provisional Patent Application No. 63/251,386, which was filed on Oct. 1, 2021, the disclosure of which is incorporated herein in its entirety by this reference.

BACKGROUND OF THE DISCLOSURE

In recent years, there have been great expectations of disruptive innovations that may arise from the ability to obtain real-time operational data from machines used in manufacturing processes. It is understood that the implementation of systems that allow real-time operational data to be captured can enable significant improvements when used in conjunction with the rapidly evolving discipline of Data Science. As would be appreciated, such connected machines are associated with what is termed the "Industrial Internet of Things" ("IIoT") because they can communicate with and between other machines and with information and processes operational in a cloud computing environment. Commentators have broadly characterized the anticipated improvements to manufacturing processes expect to result from fully connected machines and associated processes as being akin to a "4" Industrial Revolution," which has given rise to the term "Industry 4.0" as a shorthand for the coming environment where insights derivable from analysis of real-time operational data could bring vast improvements to manufacturing processes and the products that are made from them. The related term "Smart Manufacturing" serves as a shorthand for manufacturing processes that are fully integrated and collaborative systems that can respond in real-time to meet changing demands and conditions in a manufacturing facility, in the supply network, and customer needs.

Notwithstanding the reports of the disruptive innovations that are expected to emanate from Industry 4.0 and Smart Manufacturing, progress toward widespread adoption has been relatively slow. Modern machines—that is, manufacturing equipment brought online over the last decade—are more likely to have a native configuration of sensors and software from which data can be collected and processed for use in data analytics processes. However, many—if not a majority—of today's manufacturing facilities utilize legacy machines brought online when the need for connected communication between and among other machines operational in a manufacturing process did not exist.

Legacy machines are deeply rooted in the manufacturing world; most facilities continue to depend on production equipment and other systems that may be decades old. On a manufacturing plant floor, replacing older manufacturing equipment may be balanced against competing interests. While some business stakeholders might want to reap the benefits of improved data insights from manufacturing processes, practically speaking, this can be a financial and logistical challenge for many facilities. Legacy machines can be associated with millions of dollars in capital expenditures and years of facilities planning, not to mention significant investments in supply chain management modifications, process improvements, implementation of enhanced compliance and safety systems, and the overhaul of operator training, among other things. These legacy machines were most likely purchased in the first order with the expectation that they would last decades and that the upfront purchase costs could be partially recouped by depreciating the equipment over many years. It will then make little sense to obsolete many legacy machines if the downsides of acquiring new, natively "smart" manufacturing equipment may outweigh the benefits from real-time data capture and analytical insights derivable therefrom for many manufacturers for a long time to come.

It follows that for many manufacturers using legacy machines in their processes that nonetheless wish to reap the benefits potentially afforded by connected machines, the more logical approach will be retrofitting their existing machines with real-time operational data capture and reporting capabilities to allow valuable manufacturing insights to be derived from modern data analytics processes.

Early efforts to generate data capture from already-existing machines—also termed "legacy machines"—initially focused primarily on the problem of obtaining data using sensors attached to or engaged with legacy machines. For example, legacy machines can be retrofitted with WiFi-enabled vibration and temperature sensors. However, it soon became apparent that it was not enough to collect data from a sensor; rather, any collected data should have relevance in context.

That is, to generate actionable insights about a manufacturing process in which legacy machines are used, not only should data be collectible from the machines, any operational data generated therefrom should also be integrated with other data to enable interactions and relationships to be derivable from the data so that it can be suitably analyzed in the rapidly evolving world of manufacturing data analytics and insights. Implementation of Industry 4.0 and Smart Manufacturing has thus evolved from merely collecting data from legacy machines in the first order to a current understanding that any information collected from legacy machines should comprise context. There are multiple challenges in obtaining actionable insights from operational data generated in manufacturing processes. First, process data should be derivable from a machine operating in the process as real-time operational data. When multiple machines are operating in a manufacturing or assembly environment, each machine relevant to the process should be able to generate data that is in real-time vis-a-vis pertinent other machines operating therein. Also, data generated from a plurality of machines should be integrated to be processed as a collection of data generated from a system.

Some reports say that, on average, much industrial equipment in use today has been in operation for more than 20 years, with some machines being in use for even longer. To this end, legacy machines in use in manufacturing or assembly environments today have a good chance of being natively configured with programmable logic controllers ("PLC"), although some legacy machines, especially ones brought online before the mid-1990s, could have other data output functionality, such as meters, indicators, etc. For those machines having PLC functionality, data could be output from the machines, typically in a PLC platform-standard protocol or language or sometimes in a proprietary data format. Such data output would allow the generation of after-the-fact knowledge about the operation of the specific machine in a previously conducted process. Similarly, other PLC-enabled legacy machines would output machine-specific data after the fact data. In some cases, but not all, PLC-enabled machines could also comprise data input capabilities, such as updating the machine's operation instructions.

Data generated from such PLC-enabled machines would not be natively interoperable with other data derived from other PLC-enabled machines run via other, independent computer controls. Data generated from one or more PLC-enabled machines would thus be understandable only in the context of the specific machines vis-a-vis their individual effects or influences on the subject manufacturing process or, sometimes, a product(s) generated therefrom. While statistical analysis could be conducted on a combination of the independently generated machine data streams, without attendant knowledge of interactions between and among the machines during their real-time operation in the process, the data cannot generate the more profound benefits provided by modern Data Science. For example, detailed predictive analysis cannot be conducted on individual data streams generated from each legacy machine operational in a manufacturing process.

For example, adding a temperature and/or vibration sensor to a legacy machine may provide advance notice that lubrication is needed when a temperature and/or vibrational increase is detected above a pre-defined threshold. Without real-time operational data obtained from each individual machine operational in the process, little if any insight can be generated about what influence or effect (if any) that machine's lack of lubrication might have on the other machines operational in real-time in the process, on the manufacturing process as a whole, and/or on a product that is an output of the process.

In the specific case of scales used in industrial processes, issues associated with inaccurate weighing of ingredients can be highly relevant, if not critical, to the content and quality of industrial processes where one or more ingredients used to generate an output of the process involve or are associated with the generation of a substantially accurate weight, where "accurate" is in the context of the subject process and any output thereof. Irrespective of the correctness of other aspects of an industrial process control that can be measured in an industrial process via IIoT functionality, accurate weighing often is a key metric of the process. For example, products that are delivered underweight or below count can lead to customer complaints, expensive efforts to make the order right, potential legal or regulatory action, or recalls. When sale of a product is by a weight or a count, manufacturers may incorporate additional material—that is, overfill to prevent underfill—which, of course, can generate lost revenue. In other situations, a lack of accurate weight information for an ingredient in an industrial process can result in misalignment of a product with acceptance specifications, which can mean that a batch of product might not be able to be sold. This can generate not only ingredient and labor waste, but also the need to dispose of the output can create additional costs. Such disposal can be quite expensive when ingredients in the product are hazardous or when disposal volumes are large. Moreover, disposal of product that cannot be sold when it does not meet specifications may affect environmental and/or sustainability compliance requirements for that company.

It has become apparent that retrofitting a manufacturing or assembly environment comprising one or more legacy machines requires more than connecting a legacy machine to a cloud computing infrastructure. Data derived from a legacy machine that does not incorporate context from the specific manufacturing ecosystem will likely possess little, if any utility. This means that any attempt to reconfigure manufacturing ecosystems comprising one or more legacy machines should incorporate information about each specific legacy machine, the manufacturing processes in which they are used, and the products that are the output of the process. Currently, there is no streamlined approach to reconfiguration because every manufacturing or assembly environment is configured differently, and each is considered unique akin to the irreducibility of any complex system.

To this end, manufacturers operating legacy machines today likely acquired these machines over the years for reasons that made sense for processes and products being made at the time and that would probably be made in the future as such were known at the time of the selection of each legacy machine for incorporation into a specific manufacturing or assembly environment. These legacy machines were also likely modified over the years to accommodate the manufacturer's evolution of process, ingredient, and component modifications.

Moreover, each company probably generated protocols and procedures to collect, process, and store information about and derived from its manufacturing or assembly environments in company-specific formats. In short, each manufacturer could rightly consider its manufacturing or assembly environment to be a singularity or, more colloquially, a "snowflake." This means that any attempt to upgrade a specific manufacturing or assembly environment to operate in the Industry 4.0 and Smart Manufacturing realms may likely be regarded by a manufacturing to comprise wholly unique characteristics and individualized challenges, where customized design, planning, and implementation would be required to achieve successful reconfiguration of a manufacturing or assembly environment. This would naturally be expected to require a significant investment of time and resources in each reconfiguration process. Moreover, since the necessary expertise to reconfigure legacy machines is unlikely to be present within a manufacturer's employee ranks, even finding the required specific expertise to undertake modernization of a manufacturing or assembly environment might appear to be a daunting challenge for those who have spent their careers in a manufacturing world that today remains primarily separated from the work of information technology.

In addition to the costs associated with modernization, few manufacturing or assembly environments today maintain redundancies that can be called into production when a critical legacy machine is removed from service for reconfiguration with data collection capabilities. Indeed, it can be assumed that any legacy machine being reconfigured to enable the collection of real-time operational data therefrom would be critical to a manufacturing or assembly environment in the first order.

More significantly, reconfiguring a legacy machine for a data integration project could cause a long-standing and well-performing machine to deviate from previous specifications and cause system-wide problems. These business risks may mean that the prospect of upgrading legacy machines may be unacceptably risky.

When examining the highly customized nature of a project to upgrade a manufacturing or assembly environment, manufacturing paradigms to which most companies adhere to today, many corporate decisionmakers may find the financial costs associated with reconfiguration to meet the goals of Industry 4.0 and Smart Manufacturing outweigh any as-yet unproven cost and/or efficiency benefits. It follows that there is a significant need for improvements in methods to reconfigure one or more legacy machines in a manufacturing or assembly environment to allow real-time operational data associated with manufacturing or assembly processes to be derived therefrom. The present disclosure provides these and other improvements.

SUMMARY OF THE DISCLOSURE

In accordance with an exemplary embodiment of the present disclosure, there is provided a method of generating reconfiguration instructions for reconfiguring at least one legacy machine in accordance with a reconfiguration event. The method includes employing at least one of a computer and a user to identify a manufacturing or assembly environment having the at least one legacy machine, the at least one legacy machine requiring reconfiguration for generation of real-time operational data and reporting capabilities, the reporting capabilities including collection and processing of a real-time data stream derived from operation of the at one legacy machine during a manufacturing or assembly process operational within the manufacturing or assembly environment, the manufacturing or assembly process producing at least one product; employing at least one of the computer and the user to collect information associated with each of (i) the at least one legacy machine, (ii) the manufacturing or assembly environment, and (iii) the manufacturing or assembly process; and employing at least one of a reconfiguration engine and the user to generate the reconfiguration instructions.

In accordance with one aspect of the present disclosure, the at least one legacy machine includes a digital weighing or counting scale.

In accordance with another aspect of the present disclosure, the reconfiguration engine is associated with a library of information configured to convert an electrical signal generated by the digital weighing or counting scale into the real-time data stream for processing in a data analytics program operational in a cloud computing environment.

In accordance with still another aspect of the present disclosure, the reconfiguration instructions include instructions for the selection of an IIoT gateway device having features and characteristics suitable for use in the manufacturing or assembly environment.

In accordance with yet another aspect of the present disclosure, the IIoT gateway device includes edge computing capabilities.

In accordance with still another aspect of the present disclosure, the IIoT gateway device is configured to communicate with a cloud server, the cloud server configured to process, analyze and store operational and processed data output by the IIoT gateway device, wherein at least some of the operational and processed data is generated by the at least one legacy machine.

In accordance with yet another aspect of the present disclosure, the IIoT gateway device is configured to communicate with a cloud server, the cloud server configured to receive at least one data stream associated with the manufacturing or assembly process.

In accordance with still another aspect of the present disclosure, the at least one data stream associated with the manufacturing or assembly process is associated with at least one of (i) supply chain information associated with the manufacturing or assembly process, (ii) compliance-related information associated with the product, and (iii) an enterprise resource planning network.

In accordance with yet another aspect of the present disclosure, the user is in real-time video communication with an expert technician.

In accordance with still another aspect of the present disclosure, the reconfiguration engine includes a reconfiguration information library generated from a plurality of prior legacy machine reconfiguration events.

In accordance with yet another aspect of the present disclosure, the plurality of prior legacy machine reconfiguration events is associated with a plurality of different manufacturing or assembly environments.

In accordance with still another aspect of the present disclosure, the reconfiguration information library is configured to be updated in accordance with legacy machine reconfiguration information after completion of an associated legacy machine reconfiguration event.

In accordance with yet another aspect of the present disclosure, the reconfiguration engine includes a reconfiguration information library and the collected information includes images or videos of the manufacturing or assembly environment and the at least one legacy machine, the images or videos being stored within the reconfiguration information library for use during subsequent reconfiguration events.

In accordance with still another aspect of the present disclosure, the reconfiguration engine includes a reconfiguration information library, and the method further includes employing the user to at least partially review the reconfiguration instructions; and storing the reconfiguration instructions in the reconfiguration information library after the user reviews the reconfiguration instructions.

In accordance with yet another aspect of the present disclosure, the at least one legacy machine is configured with programmable logic functionality, and the reconfiguration instructions are generated in accordance with whether an operational data stream generated from each of the at least one legacy machine requires a data integration step before providing the operational data stream to a data analytics program for processing.

In accordance with another exemplary embodiment of the present disclosure, there is provided a system for generating reconfiguration instructions for reconfiguring at least one legacy machine of a manufacturing or assembly environment. The system includes a reconfiguration engine having a reconfiguration information library storing library information related to a plurality of reconfiguration events, the reconfiguration engine configured to receive input information relating to one or more of (i) the at least one legacy machine, (ii) the manufacturing or assembly environment, (iii) a manufacturing or assembly process performed within the manufacturing or assembly environment and (iv) at least one finished product produced by the manufacturing or assembly process, in which the reconfiguration engine generates the reconfiguration instructions in accordance with the library information and the input information.

In accordance with one aspect of the present disclosure, the reconfiguration information library includes a plurality of reconfiguration engine information sets associated respectively with one or more types or classes of legacy machines, the reconfiguration instructions being generated in accordance with at least one of the reconfiguration engine information sets.

In accordance with another aspect of the present disclosure, the reconfiguration engine includes at least one input to receive the input information and at least one output to communicate the reconfiguration instructions.

In accordance with still another aspect of the present disclosure, the system further includes a user, the user verifying or modifying the reconfiguration instructions generated by the reconfiguration engine.

In accordance with yet another aspect of the present disclosure, the reconfiguration engine is configured to receive at least a portion of the input information from the user.

Additional advantages of the disclosure will be outlined in part in the description that follows, and in position will be apparent from the description or may be learned by practice of the disclosure. The advantages of the disclosure will be realized and attained through the elements and combination particularly pointed out in the appended claims. It is to be understood that both the preceding general description and the following detailed description are exemplary and explanatory only and are not restrictive of the disclosure, as claimed.

BRIEF DESCRIPTION OF THE SEVERAL VIEWS OF THE DRAWINGS

The following detailed description of an exemplary embodiment of the present disclosure will be better understood when read in conjunction with the appended drawings. For the purpose of illustrating the present disclosure, there is shown in the drawings an exemplary embodiment. It should be understood, however, that the subject application is not limited to the precise arrangements and instrumentalities shown.

DETAILED DESCRIPTION OF THE DISCLOSURE

Figure 1:
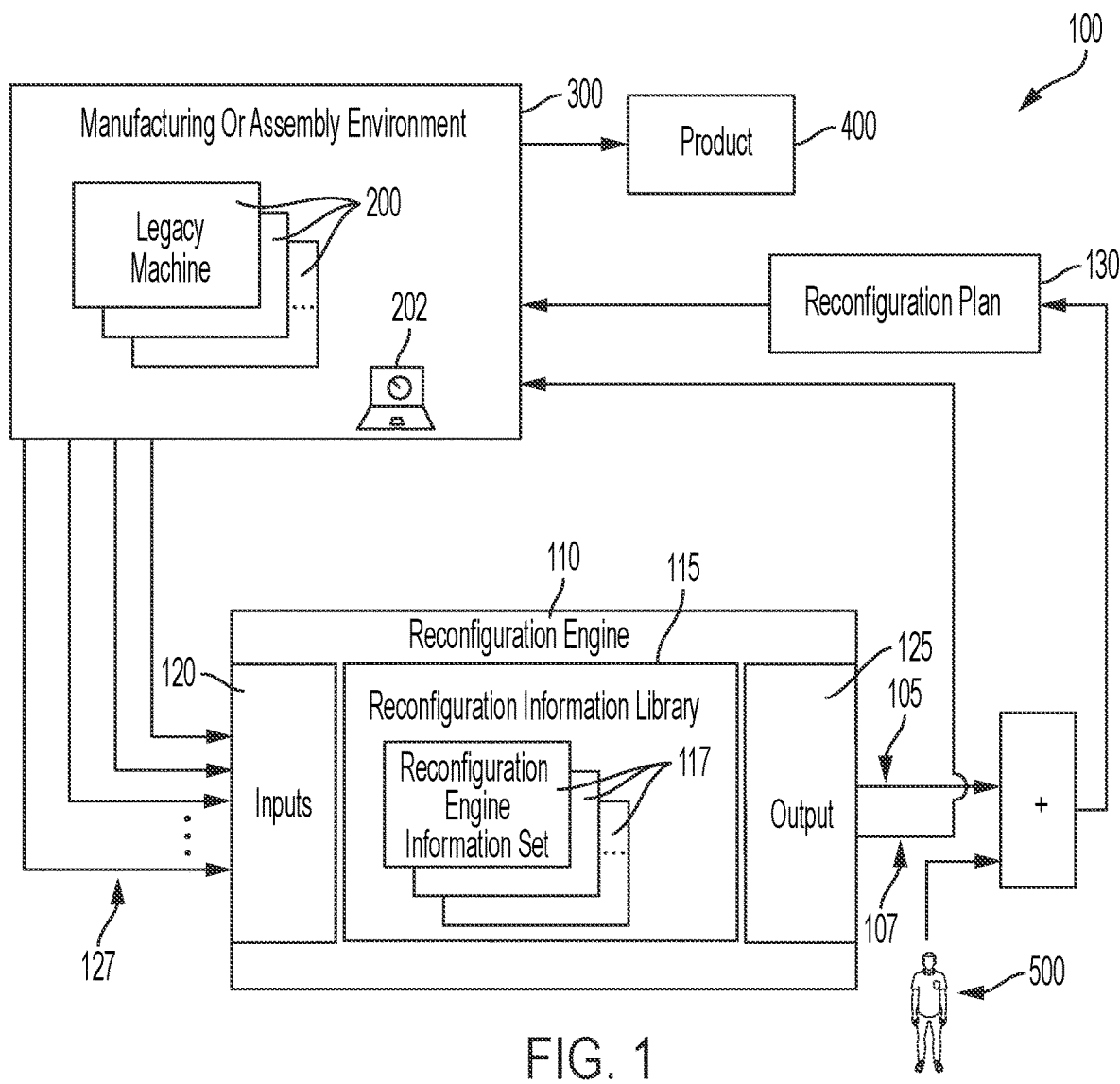
FIG. 1 is a flow diagram representing a system for reconfiguring a manufacturing or assembly environment, in accordance with various exemplary embodiment of the present disclosure.

Reference will now be made in detail to an exemplary embodiments of the present disclosure, such as those illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as upper, lower, top, bottom, above, below and diagonal, are used with respect to the accompanying drawings. Such directional terms used in conjunction with the following description of the drawings should not be construed to limit the scope of the present disclosure in any manner not explicitly set forth. Additionally, the term "a," as used in the specification, means "at least one." The terminology includes the words above specifically mentioned, derivatives thereof, and words of similar import.

Unless defined otherwise, all technical and scientific terms used herein have the same meaning as is commonly understood by one of ordinary skill in the art to which this disclosure belongs. If there is a plurality of definitions for a term herein, those in this section prevail unless stated otherwise.

Wherever the phrases "for example," "such as," "including," and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common patent law definition of "comprising" and is therefore interpreted to be an open term meaning "at least the following" and is also interpreted not to exclude additional features, limitations, aspects, etc.

"About" is meant to account for variations due to experimental error. All measurements or numbers are implicitly understood to be modified by the word about, even if the measurement or number is not explicitly modified by the word about.

"Exemplary" as used herein shall mean serving as an example.

"Substantially" (or alternatively "effectively") is meant to permit deviations from the descriptive term that do not negatively impact the intended purpose. Descriptive terms are implicitly understood to be modified by the word substantially, even if the term is not explicitly modified by the word "substantially."

The "Industrial Internet of things" (IIoT) refers to systems and processes comprising interconnected sensors, instruments, and other devices networked together with computers industrial applications. This connectivity may allow for data collection, exchange, and analysis, potentially facilitating improvements in, for example, productivity, efficiency, product quality, and waste reduction, as well as attendant economic benefits. The IIoT comprises a distributed control system that may allow for a higher degree of automation by using either or both of edge or cloud computing models to refine and optimize the process controls associated with a manufacturing process. When implemented in a manufacturing or assembly environment, the IIoT provides the capability to connect as many as all machines used in a manufacturing process to the Internet, including legacy machines and systems, when such legacy machines 200 have been appropriately retrofitted to allow real-time operational data to be derived therefrom.

"Cloud computing" is a model for enabling ubiquitous, convenient, on-demand network access to a shared pool of configurable computing resources (e.g., networks, servers, storage, applications, and services) that may be rapidly provisioned and released with minimal management effort or service provider interaction.

"Edge computing" is a model that takes place at or near the physical location of either the user or the source of the data. By placing computing services closer to the locations where the data is generated, users may benefit from faster, more reliable data collection. Edge computing is one way that a company may use and distribute a shared pool of resources across many locations, even while allowing machine-generated data to be collected and analyzed in real-time.

"Hybrid computing" is a model combining cloud and edge computing characteristics. For example, machine-generated data relevant to a manufacturing or assembly process as it is occurring may be processed on the edge in real-time, and adjustments may be made immediately, if appropriate. Other machine-generated data may be stored for subsequent analysis, such as to improve subsequent runs of the same or similar manufacturing or assembly process using those same or similar machines.

"Manufacturing data analytics" is the use of real-time machine data generated during a manufacturing or assembly process and other relevant data to derive knowledge about and attendant management of quality, performance and yield, resource planning, costs, supply chains, and the like. Manufacturing analytics relies upon predictive analytics, big data analytics, the industrial internet of things (IIoT), machine learning, and modern computing models.

"Legacy machine" as used herein refers to a machine used in a manufacturing or assembly environment that is not natively configured communications engagement with a cloud computing environment. These are machines or industrial assets that do not intrinsically support real-time communication with modern computing infrastructures. In other words, they are not natively "smart machines." Any manufacturing or assembly environment designed more than a few years ago will likely comprise several legacy machines. The older the industry is, the more likely the manufacturing or assembly environment will include legacy machines. A legacy system typically is an old or outdated system, technology or software application that continues to be used by an organization because it still performs the functions it was initially intended to do. Generally, legacy systems may be minimally supported by the manufacturer, and they may be limited in terms of expansion in a subject manufacturing system. Replacement of such machines, while possible, is often not desirable due to cost, difficulties of integration with other machines, and/or because they work effectively and, despite the inability to collect and deploy real-time data analytics, there is no urgent need to replace them.

"Real-time data" refers to information that may be processed, consumed, and/or acted upon immediately after generation There are two types of real-time analytics. On-demand real-time analytics requires an end user or system to create a query after which the analytic results are delivered. Continuous analytics, also called "streaming data analytics," analyzes data as it is collected and alerts users or triggers a response to detected events. As mobile devices, Internet of Things (IoT) products, sensors and other sources create more data at greater speeds, real-time analytics has become increasingly desirable, as it allows a constant flow of data to be processed in motion rather than after storage. The present disclosure provides utility in each type of data analytics.

Throughout the subject application, various aspects thereof can be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present disclosure may be combined in any suitable manner in one or more exemplary embodiments. One skilled in the relevant art will recognize, in light of the description herein, that the present disclosure can be practiced without one or more of the specific features or advantages of a particular exemplary embodiment. In other instances, additional features and advantages may be recognized in certain exemplary embodiments that may not be present in all exemplary embodiments of the present disclosure.

Referring now to FIG. 1, there is shown a system 100 for reconfiguring a manufacturing or assembly environment 300 incorporating one or more legacy devices 200 (such as a digital weighing or counting scale 202), in accordance with an exemplary embodiment of the present disclosure. System 100 includes a reconfiguration engine 110 having a reconfiguration information library 115 with one or more reconfiguration engine information sets 117 associated respectively with one or more types or classes of legacy machines 200, and one or more inputs 120 for receiving input information 127 relating to (i) legacy machines 200, (ii) manufacturing or assembly environment 300, (iii) a manufacturing or assembly process performed within the manufacturing or assembly environment and/or (iv) one or more finished products 400 produced by the manufacturing or assembly process.

Reconfiguration engine 110 processes the input information 127 to provide reconfiguration instructions 105 (via output 125), which alone or together with confirmation from or additional reconfiguration instructions provided by a user or technician 500 (who may be remote or present at manufacturing or assembly environment 300), may be used, e.g., to generate a reconfiguration plan 130 for reconfiguring one or more of legacy machines 200, for example, to enable to the collection of real-time operational data therefrom. Reconfiguration engine 110 may also be configured to produce testing instructions 107 for testing legacy machines 200 reconfigured in accordance with the reconfiguration plan 130.

In accordance with various exemplary embodiments of the present disclosure, a legacy machine of interest for reconfiguration to enable the collection of real-time operational data therefrom (e.g., one of legacy machines 200) may comprise PLC-functionality. As would be appreciated, a PLC is an industrial computer-like control system that continuously monitors the state of an associated machine and makes decisions for one or more connected machines based upon a custom program configured to control the operation of the machine(s) in a process in which the machine is operational. PLC-enabled legacy machines, (e.g., one or more legacy machines 200 comprising such functionality), may comprise some native connectivity (e.g., serial ports, ethernet, etc.), such as to enable PLC functionality from which specific operational data for an individual machine may be uploaded into a computer and, in some cases, into which instructions for operation may be input. As would be appreciated, such connectivity may be, and often was, connected to the internet; however, when designed, a legacy machine was not intended to provide data from which real-time operational information about a subject manufacturing or assembly process in which one or more legacy machines are operational could be derived. Older legacy machines may also have been designed and manufactured without any data input/output capabilities. Data output from these, often vintage, machines may be via an analog dial, electrical signal (e.g., light, horn, etc.), or the like.

PLC-functionality in a legacy machine (e.g., a legacy machine 200 comprising such functionality) provides an ability to change and replicate the operation or process associated with the machine while also allowing collection and communication of operational data about a machine(s) operational with that PLC, and only those machine(s). PLC-protocols used in legacy machines in general comprise an expansive list including, in some examples:

EtherNet/IP
ControlNet
DeviceNet
Remote I/O
DF-1 Protocol
DH-plus
Modbus TCP/IP
Modbus RTU Profibus
ProfiNet
EtherCAT
Powerlink
BACnet
Lonworks
OPC UA
CANBUS
ASi—bus Actuator Sensor Interface
HART—Highway Addressable Remote Transducer Protocol
Standard Serial (RS-232, RS-422, and RS-485) Protocols PLC-enabled legacy machines (e.g., one or more of legacy machines 200 comprising such functionality) may comprise several operational parameters or configurations, including those that might be relevant to the operation thereof, for example:

Switches, Pilot Devices, and Pushbuttons
Sensing Devices
    Electro-mechanical Limit Switches
    Photoelectric Sensors
    Inductive and Capacitive Proximity Sensors
    Ultrasonic Sensors
    Laser Sensors
Condition Sensors
    Temperature
    Vibration
    Pressure
    Flow
    Vacuum
    Level
    Force
Electrical Sensors
    Current
    Voltage
    Resistance
    Power Factor
    Harmonics
    Magnetism
Vision Sensors
    Inspection
    Placement
    Absence
Encoders
    Rotational Speed
    Rotational Position
    Linear Speed
    Linear Position PLC-enabled legacy machines (e.g., one or more of legacy machines 200 comprising such functionality) may comprise several output configurations, including, for example:

Valves
    Servo
    Directional
    Proportional
Motor Controls
    Reduced Voltage Starters
    Full Voltage Starters
    AC Variable Frequency Drives (VFDs)
    DC Drives
    Steppers
    Servos
Actuators
    Linear-belted
    Linear-screw
    Linear Motor
Pilot Lights and Indicators
    Horns and Alarms
    Stack lights
    Panel Meters and Chart Recorders
    Printers
Control Relays
    Timers
    Counters/Totalizer
Safety
    Gates
    Light Curtains
    Safety Mats
    Scanners
    Bump-strips
    Other Sensors
    Safety Relays
    Safety PLC A wide variety of legacy machines (e.g., one or more of legacy machines 200) may be relevant for reconfiguration using the methodology herein. No two manufacturing or assembly environments may have identical configurations of legacy machines. Even for the same legacy machines, during the lifecycles of each machine contemplated, each may have been modified and/or used in significantly different manners. Even for legacy machines used to make products that are ostensibly the same (e.g., paper making machines, bakery equipment, etc.), the processes, raw materials, servicing techniques, upgrades, etc., may, over time, result in differences between individual machines operated in different manufacturing or assembly environments.

A "manufacturing or assembly process" as used herein is an overall process comprising ingredients or components as inputs from which one or more products (e.g., product 400) are the outputs after processing in a manufacturing or assembly environment (e.g., manufacturing or assembly environment 300), including one or more legacy machines, such as, for example, one or more of legacy machines 200. The manufacturing or assembly process may be conducted according to a defined process operational in the manufacturing or assembly environment, where one or more legacy machines participate in the process according to instructions associated therewith. A manufacturing or assembly process may comprise a plurality of steps or sub-processes that, as a collection, result in the production of one or more products (e.g., product 400). One or more products may be associated with compliance-related metrics (e.g., specifications, regulatory requirements, etc.). A product failure that is an output of a manufacturing or assembly process to align with one or more compliance-related metrics defined for or associated with the product may result from operational aspects of one or more machines participating in the manufacturing or assembly processes. Thus, real-time operational data derivable from manufacturing or assembly processes may be of interest to identify manufacturing or equipment element operational parameters that affect an alignment (or lack thereof) with compliance-related metrics of a product.

The product(s) that are output from a manufacturing or assembly process (e.g., product 400 output from manufacturing or assembly process 300) may comprise a single finished product ready for sale or a product that is a component or collection of components that is intended for use in another product that would itself be used in a subsequent manufacturing or assembly process. Non-limiting examples of finished products that are the output of the manufacturing or assembly process in which one or more legacy machines are operational may comprise foodstuffs (e.g., baked goods, prepared foods, packaged foods, pet food, infant formula), pharmaceuticals, personal care products (e.g., hair care products, skincare products, makeup, personal hygiene products, etc.), household and industrial cleaning supplies (e.g., laundry detergent, floor cleaners, disinfectants, etc.), landscape products, (e.g., fertilizers, ground covers, seeds, hardscape materials, etc.), electronics (e.g., computers, video games, cellular phones, etc.), automotive parts, durable medical devices (e.g., surgical implants, cardiac pacemakers, etc.), disposable medical devices (e.g., syringes, masks, gloves, etc.), durable household goods (e.g., vacuums, stoves, dishwashers, etc.), mechanical equipment (e.g., tools, machinery, etc.), vehicles (e.g., automobiles, trucks, aircraft, etc.).

A finished product (e.g., product 400) may also comprise an ingredient or component that can generate a finished product. For example, a collection of automotive parts assembled as components (e.g., a kit) for incorporation in an automotive assembly process is an example of a product that is an output of a manufacturing or assembly process that is an ingredient or component in another product. A mixture of ingredients added to other ingredients may also be an output of a manufacturing or assembly process herein, such as a bakery product.

In accordance with various exemplary embodiments of the present disclosure, a manufacturing or assembly environment (e.g., environment 300) is configured with at least one legacy machine (e.g., at least one legacy machine 200) operational therein. In accordance with one aspect of the present disclosure, at least one of the legacy machines includes a digital weighing scale that is natively configured with analogue data collection and reporting capability. A weighing scale is operational to determine a weight of an object placed thereon. In accordance with another aspect of the present disclosure, a legacy machine may comprise a digital counting scale. As would be appreciated, counting scales not only weigh but also count the number of pieces placed on the scale. It does this by using a calibration formula where a weight of a single object of interest is incorporated within programming associated with an object weighing and counting operation of interest. For example, a collection of identical or like objects may comprise a total weight and the number of objects may be determined by dividing the total weight by the calibrated weight of a single object.

A legacy machine (e.g., one of legacy machines 200), may also include a digital scale. Digital weighing scales (which may optionally include a counting function as appropriate) utilize a load cell that when weight is placed on the scale, a voltage change is generated. The basic principle of a load cell is it converts physical quantities such as compression, pressure, force into electrical signals, to provide an output associated with the weight of an object. In one exemplary embodiment, the scale comprises a strain gauge load cell. Strain gages are generally manufactured from a flat foil material, shaped into a long serpentine path and carefully bonded to a spring element called a load cell. When the shape of the resistor (e.g., the strain gage) is allowed to change, the resistance value also changes. The load cell bends when weight is applied to the platform, which changes the shape of the gauge and consequently increases its resistance value. Four strategically placed strain gages will typically be applied to the spring element and wired together to form a Wheatstone's bridge. This bridge is an electrical circuit that measures the unknown electrical resistance of the gage and turns it into a voltage output. The voltage produced by the bridge is passed through an ADC (analog to digital converter) and the digital signal is sent to the scale's display where you read the weight of the object you're weighing. However, and as would be appreciated, a generated electrical signal does not incorporate any information without there also being a look up table or other type of dictionary etc. that can translate/convert the electrical signal into information that is useful for an industrial process in context. The present disclosure provides systems and methods (such as system 100) to generate context-relevant information from an industrial process utilizing legacy digital scale equipment. By conversion or translation of electrical signals generated from legacy scales, the systems and methods described herein may facilitate not only transfer of scale-based data to the cloud, but also the generation of meaningful operational information from such data.

A "reconfiguration" of a legacy machine (e.g., one or more of legacy machines 200) is modifying the machine to allow real-time operational data generated during a manufacturing or assembly process to be derived therefrom, where the operational data is processible as a collection of data with other data generated from or associated with the manufacturing or assembly process. Reconfigured legacy machines active in a manufacturing or assembly environment (e.g., environment 300) generate real-time operational data that may be processed in manufacturing data analytics processes to derive helpful information relevant to a manufacturing or assembly process that is currently underway or to evaluate the various influences or effects of one or more variables on a manufacturing or assembly process after conclusion thereof or on products (e.g., product 400) output from the process.

A "reconfiguration engine" (e.g., reconfiguration engine 110) is an at least partially automated system that collects and process information about each of the legacy machines (e.g., legacy machines 200), the manufacturing or assembly environment (e.g., environment 300), the manufacturing or assembly process performed within the environment, and the finished product (e.g., product 400). The reconfiguration engine may also provide reconfiguration instructions (e.g., reconfiguration instructions 105), such as instructions for selecting and installing a suitable gateway device for the manufacturing or assembly environment and assessing any data integration steps that should be implemented. The reconfiguration engine may also generate testing instructions (e.g., testing instructions 107) used to test one or more already reconfigured legacy machines. The reconfiguration engine is associated with a reconfiguration information library (e.g., reconfiguration information library 115) comprising information from a plurality of reconfiguration events for a plurality of different manufacturing or assembly environments, where each of the plurality of manufacturing or assembly environments includes one or more legacy machines.

The systems and methods derived herein (e.g., system 100) efficiently and effectively provide reconfiguration instructions for reconfiguring one or more legacy machines operational in a manufacturing or assembly environment (e.g., environment 300) to allow useful information and insights to be derived therefrom. In accordance with one aspect of the present disclosure, the manufacturing or assembly environment incorporates at least one scale to provide at least one weight-related parameter in the subject manufacturing or assembly process. While some manufacturers have successfully reconfigured legacy machines or equipment elements previously, as discussed herein, widespread adoption of Industry 4.0 and Smart Manufacturing has been significantly slower than initially expected, due in significant part to the unique character and requirements of each manufacturing or assembly environment and the legacy machines operational therein. That is, there is no one size fits all reconfiguration process for a manufacturing or assembly environment comprising one or more legacy machines. Moreover, manufacturers may not have the internal expertise to design and implement a reconfiguration process. While outside contractors having the requisite knowledge may be engaged, there is a shortage of externally available expertise, making the necessary human resources challenging to find, expensive, and subject to scheduling delays.

The present disclosure provides systems and methods (e.g., system 100) that may significantly reduce the complexities and complications (e.g., time, costs, risks, expertise identification, etc.) typically associated with modernizing legacy machines (e.g., legacy machines 200) operational in a manufacturing or assembly environment, such as environment 300. With the use of the legacy machine reconfiguration engine and associated reconfiguration information library disclosed herein, manufacturers having legacy machines that require modernization in their respective manufacturing or assembly environments may be more inclined to embark on the process and, when they do, the process may likely be conducted more efficiently and with less risk. The methodology herein is intended to streamline the reconfiguration of legacy machines and enhance the scalability of the currently limited expertise needed to bring them into the Industry 4.0 and Smart Manufacturing paradigms.

Moreover, in accordance with one aspect of the present disclosure, information may be collected about the operation of legacy machines (e.g., legacy machines 200) in a manufacturing or assembly environment (e.g., environment 300) after reconfiguration via ongoing monitoring of the reconfigured legacy machines. This monitoring may better ensure that the previous reconfiguration instructions (e.g., instructions 105) yielded the intended results when a reconfigured legacy machine is subsequently operated in a manufacturing or assembly environment. If additional modifications to one or more legacy machines are indicated, additional reconfiguration instructions may automatically be delivered to owners or managers of the manufacturing or assembly environment. Such instructions may also be provided to other legacy machines requiring the same or a similar modification, such as those reconfigured using those exact instructions operational in different manufacturing or assembly environments. In various exemplary embodiments, reconfiguration instructions (such as updates) may be delivered automatically to a previously reconfigured legacy machine via the reconfiguration engine, such as engine 110. In the embodiment depicted in FIG. 1, for example, reconfiguration instructions 105 are provided via an output 125.

With reference to FIG. 1, a legacy machine reconfiguration information library 115 associated with a reconfiguration engine 110 may be populated with information derived from a plurality of previous reconfiguration processes for a plurality of legacy machines 200 operational in each of a plurality of manufacturing or assembly environments 300. Information about each prior legacy machine 200 reconfiguration and any relevant associated information (e.g., the manufacturing or assembly environment 300, ingredients or components, product 400, etc.) populates a reconfiguration engine information set 117 used to define the features and characteristics of a subsequent legacy machine 200 reconfiguration event. This information set allows the reconfiguration engine 110 to determine when a legacy machine 200 in need of reconfiguration is the same or similar to another legacy machine 200 (of the same or different manufacturing or assembly environment 300) for which reconfiguration information already exists in the reconfiguration information library 115. If the reconfiguration engine 110 identifies relevant legacy machine reconfiguration information, reconfiguration and/or testing instructions 105, 107 pertinent to a current reconfiguration event can be generated. As a result, each reconfiguration event does not need to be conducted fresh for each new reconfiguration event. At a minimum, some reconfiguration instructions 105 for a current reconfiguration event may be derived from information generated from one or more previous reconfiguration events. In some cases, substantially all reconfiguration instructions 105 for a current reconfiguration event may be generated from information from one or more previous reconfiguration events.

In their work in installing, managing, and servicing manufacturing or assembly environments associated with a large number of manufacturers, products, machine types, manufacturing or assembly process, etc., the inventors herein have recognized that, in many cases, the same or similar legacy machines (e.g., one or more legacy machines 200) are often present in a plurality of manufacturing or assembly environments. Thus, the information generated from a reconfiguration event for a first manufacturer may have utility in a subsequent reconfiguration event for a second manufacturer. While different manufacturers will not have visibility to the legacy machine reconfiguration information generated from reconfigurations undertaken in unrelated manufacturing or assembly environments, such information may be included in a partially automated process to reduce the number of variables that need to be considered when reconfiguring legacy machines in other manufacturing or assembly environments.

Reconfiguration instructions 105 delivered by the reconfiguration engine 110 via output 125 may be derived from information generated from a plurality of reconfiguration events associated with a plurality of legacy machines 200 present in a plurality of unrelated manufacturing or assembly environments. The information generated from one or a plurality of legacy machines 200 may be configured as a library of information operational in the reconfiguration engine 110.

In accordance with another aspect of the present disclosure, a manufacturer having one or more legacy machines operational in a manufacturing or assembly environment (e.g., environment 300) may request assistance from a reconfiguration contractor having access to the reconfiguration engine (e.g., engine 110). In other circumstances, the reconfiguration engine may be accessible in a "Software as a Service" framework. When the reconfiguration engine determines that one or more aspects of a legacy machine needing modernization (e.g., one or more legacy machines 200) are identical or substantially similar to one or more aspects of a previously reconfigured legacy machine, reconfiguration instructions (e.g., instructions 105) may be generated for reconfiguration of that machine from analysis of that last reconfiguration event. The reconfiguration engine determination may be validated or confirmed by an expert technician, as discussed hereinafter. It follows that by using previously generated legacy machine reconfiguration instructions instead of creating wholly new reconfiguration instructions for each new legacy machine reconfiguration event, efforts in reconfiguring legacy machines in different manufacturing or assembly environments may be reduced. This efficiency, in turn, is expected to reduce the time, costs, and risks associated with reconfiguration of legacy machines operational in a manufacturing or assembly environment which, in turn, may improve adoption of Industry 4.0 and Smart Manufacturing processes at many manufacturers that would otherwise be reluctant do so.

In accordance with one non-limiting exemplary embodiment of the present disclosure, a master look up table may be generated from a first legacy machine (e.g., machine 200), such as a digital scale having known specifications. The master look up table translates the meaning of electrical signals generated from the scale. The master look up table may be redeployable for use with other legacy digital scales of the same or similar type. The master look up table may be generated, in various exemplary embodiments, during one or more calibration events for a scale. For example, a plurality of different weights of certified values may be placed on the scale and the scale calibrated to that weight. The electrical signals generated from each known weight placed on the scale may be recorded for use in the look up table. The information in the master look up table may be useful for other digital scales having the same model type. In accordance with various exemplary embodiments, a plurality of master look up tables may be useful for each of different industrial processes, for example with different types of manufacturing, products, etc. In this regard, a digital scale used for a pharmaceutical process where powders are weighed may require a different level of accuracy and precision than a bakery process where powders are weighed, even when the same model of digital scale may be used. A master lookup table for a bakery process may not include enough information to allow generation of accurate and precise measurement information as needed for a pharmaceutical process, but it may be that a master look up table generated for a pharmaceutical process may be suitable for use in a bakery process. The process herein therefore may also include selection of a master look up table—or more broadly, selection of a data source that may provide translation of an electrical signal generated from a legacy digital scale. The look up table may also incorporate other information that could be relevant to generating an accurate and precise weight for an ingredient in a manufacturing or assembly process, for example, corrections for temperature, humidity, etc., that may be relevant to a weighing operation. By creating a reusable database of legacy digital scale information that may be reused for different manufacturing ecosystems, the efficiency of legacy machine reconfiguration may be enhanced.

In accordance with another non-limiting exemplary embodiment of the present disclosure, a master look up table is generated from a first legacy digital scale having known specifications. The master look up table translates the meaning of electrical signals generated from the scale. The master look up table is redeployable for use with other legacy digital scales of the same or similar type. The master look up table may be generated, in accordance with various exemplary embodiments, during one or more calibration events for a digital scale having a model number, type, manufacturer, etc. For example, a plurality of different weights of certified values may be placed on the scale and the scale calibrated to that weight. The electrical signals generated from each known weight placed on the scale may be recorded for use in the look up table. The information in the master look up table may be useful for other digital scales having the same model type.

In accordance with various exemplary embodiments of the present disclosure, a plurality of master look up tables may be useful for each of different industrial processes, for example with different types of manufacturing, products, etc. In this regard, a digital scale used for pharmaceutical process where powders are weighed may require a different level of accuracy and precision than a bakery process where powders are weighed, even when the same model of digital scale may be used. A master lookup table for a bakery process may not include enough information to allow generation of accurate and precise measurement information as needed for a pharmaceutical process, but it may be that a master look up table generated for a pharmaceutical process may be suitable for use in a bakery process. The process herein therefore may also include selection of a master look up table—or more broadly, selection of a data source that provides translation of an electrical signal generated from a legacy digital scale. The look up table may also incorporate other information that could be relevant to generating an accurate and precise weight for an ingredient in a manufacturing or assembly process, for example, corrections for temperature, humidity, etc., that may be relevant to a weighing operation. By creating a reusable database of legacy digital scale information that may be reused for different manufacturing ecosystems, the efficiency of legacy machine reconfiguration may be enhanced.

In accordance with other exemplary embodiments of the present disclosure, a machine learning process may be used to generate a weight from electrical signals generated from a legacy digital scale. In this regard, training sets may be generated from prior operations of the legacy scale, and such training sets may be used to detect or identify a weight generated from a scale in a subsequent process. The training sets may be provided as an element of the reconfiguration information library (e.g., library 115), such as in a deployable API or other functionality that may operate with a manufacturing or assembly environment (e.g., environment 300) in which the reconfiguration engine (e.g., engine 110) is operational.

Although the generation of master look up tables and/or machine learning processes are discussed in regard to legacy digital scales above, it is to be understood that these concepts may be used with other legacy machines to derive context-relevant information that may be used to provide real-time insights from the operation of one or more legacy machines operational in a manufacturing or assembly environment, such as one or more legacy machines 200 operating within manufacturing or assembly environment 300. For example, electrical signals generated from vibrational data collected from smart sensors configured on a particular legacy machine or device may be pre-generated and placed in a look up table and/or used with machine learning processes.

The systems and processes herein (e.g., system 100) aim to reconfigure legacy machines operational in a manufacturing or assembly environment (e.g., machines 200 operational in manufacturing or assembly environment 300) to generate a collection of real-time operational data associated with a manufacturing or assembly process for processing in manufacturing data analytics processes. In accordance with various exemplary embodiments, all of the legacy machines active in a manufacturing or assembly environment may be reconfigured using efficient processes. In some cases, however, less than all legacy machines operational in a manufacturing or assembly process may be retrofitted to generate real-time operational data. It may be beneficial that only a subset of the total number of legacy machines active in manufacturing or assembly processes be reconfigured. To this end, reducing at least some of the unknown variables or aspects associated with a manufacturing or assembly process may allow those responsible for managing the process to focus attention on those variables or aspects that remain unknown. In other cases, some of the legacy machines may be known not to affect manufacturing or product characteristics of interest materially, and these legacy machines may remain unmodified. In accordance with one aspect of the present disclosure, the methodology herein, therefore, may comprise identifying one or more legacy machines operational in a manufacturing or assembly environment that are of interest for reconfiguration.

In accordance with other exemplary embodiments of the present disclosure, a reconfiguration engine (e.g., engine 110) is deployed to identify the actions or tasks needed to reconfigure each or some of the plurality of legacy machines in a manufacturing or assembly environment (e.g., machines 200 in manufacturing or assembly environment 300). The identified actions or tasks associated with one or more legacy machines may be the same or different depending on the identities and specifications of each of the legacy machines.

In accordance with still other exemplary embodiments of the present disclosure, a remote expert technician may be on-call as needed for a reconfiguration event associated with a legacy machine (e.g., one of legacy machines 200). That is, while the reconfiguration engine may automatically identify much of the information that may be required in a subsequent reconfiguration event, such automatically generated information could benefit from an expert's confirmation of such identifications in the context of a specific manufacturing or assembly environment (e.g., environment 300). The ability to limit/reduce the need of the expert technician to participate in non-complex aspects of a reconfiguration event may allow the expert to participate in a more significant number of reconfiguration events. Travel time may also be reduced or eliminated. As noted, there is a shortage of qualified expert technicians today, and the methods herein may help alleviate this problem.

Unlike modern machines, legacy machines in general often use proprietary software and hardware to obtain data therefrom for processing in manufacturing analytics processes. Such legacy machines may be fully functional, but their age may mean that the expertise needed to make the necessary modernizing them may be in short supply. This reality may result in manufacturers having a goal to update legacy machines operational in their manufacturing or assembly environments not finding technicians with the capabilities to do so. Moreover, the expertise needed to reconfigure one or more legacy machines to generate operational data that can suitably be processed in either or both of an edge or cloud computing environment may be different from those required to analyze such generated data.

To this end, those working in or associated with manufacturing or assembly environments will have expertise in operational technology ("OT"). At the most basic level, OT refers to technology that monitors and controls specific devices and processes within industrial workflows. Compared with information technology ("IT"), OT is unique in that related hardware and software is usually (historically) designed to do specific things: control heat, monitor mechanical performance, trigger emergency shutoffs, etc. Conversely, IT systems have performed critical operations without constant human intervention-provided those workflows are within programmed functions. A person who is skilled in OT will typically not hold expertise in IT and vice versa. The merging of the historically very different OT and IT ecosystems is only a very recent occurrence. This slow merge means there is a dearth of expert technicians today. Thus, finding persons with the requisite skill sets may be difficult when a manufacturer contemplates transitioning its manufacturing or assembly environment to Industry 4.0 and Smart Manufacturing processes. Moreover, companies in the business of reconfiguring legacy machines may also find it challenging to identify people with the requisite expertise. At a minimum, a shortage of skilled workers slows the adoption of Industry 4.0 and Smart Manufacturing.

The methodologies described herein may help mitigate delays caused by the OT/IT skills gap by automating at least some of the needed decision-making required to complete the reconfiguration of one or more legacy machines in a manufacturing or assembly environment (e.g., one or more legacy machines 200 in manufacturing or assembly environment 300). Moreover, increased availability of remote expert technician expertise may generate scalability in legacy machine reconfiguration that is not available today. In short, an appropriately skilled expert technician may spend his time working on aspects of a reconfiguration process that require expert human intervention. In contrast, other aspects may be relegated to a lesser trained person located in the manufacturing or assembly environment. In some cases, the manufacturer may even be able to task its personnel to complete many of the steps needed to reconfigure one or more legacy machines, reducing the time, cost, and delays that might otherwise be associated with reconfiguration thereof. The expert technician need only be called in to address the more complicated aspects of a reconfiguration. Yet further, an outside contractor engaged in modernizing one or more legacy machines operational in a manufacturing or assembly environment may deploy a non-expert technician to that location, and that technician may be assisted in the generation of information by a remotely located expert technician.

A reconfiguration event generally comprises at least four distinct steps: information collection, reconfiguration instruction generation, reconfiguration of the legacy machines by the installation of hardware and any attendant software configurations, and testing of the reconfiguration. In accordance with various exemplary embodiments, each of these steps may be performed substantially in sequence. For example, a user or dispatched technician (e.g., user or technician 500) may collect the information at the location, and the reconfiguration engine (e.g., engine 110) and/or remote expert technician may generate the reconfiguration instructions (e.g., instructions 105) while the user or technician is at the manufacturing or assembly environment location. Any necessary hardware and software may be present at the location for use thereof. The user or technician may use the generated reconfiguration and testing instructions (e.g., reconfiguration and testing instructions 105, 107) to complete and test the reconfiguration of the legacy machines for the generation of real-time operational data therefrom. Alternatively, a user or technician may acquire the manufacturing or assembly environment and legacy machine information for the subsequent generation of reconfiguration instructions by the reconfiguration engine and/or the remote expert technician. The necessary hardware and software may be deployed to the manufacturing or assembly environment, and the generated reconfiguration instructions may assist in completing the installation and testing by the user or the technician.

As a first step to reconfiguring one or more legacy machines for real-time operational data generation (e.g., one or more of legacy machines 200), input information (e.g., input information 127) about each of the legacy machines in a manufacturing or assembly environment of interest (e.g., environment 300) may be acquired by a user or technician in the manufacturing or assembly environment location. The reconfiguration engine (e.g., engine 110) receives the input information (e.g., via one or more inputs 120) and analyzes this acquired information to determine what information about a specific legacy machine, the manufacturing or assembly environment, the generated product(s), etc. are already present in the reconfiguration information library (e.g., library 115).

Often site surveys may be generated as part of the reconfiguration design process to determine the number of constraints within a legacy machine or device (e.g., one of legacy machines 200). The first requirement may include a documentation review and a determination of modification and expectation of the user for continued operation and throughput. The user may need to produce a safety risk assessment for the legacy machine consistent with their plant's policy or create a new risk assessment to understand the safe operation of the legacy machine, complete with identification and exposure time to any potential hazards. The site survey may also often require mapping the distance of transmission for sensors mounted to a legacy machine to the subsequent edge device as plants have walls and obstructions that reduce the transmission distances of any wireless sensor or device.

The acquired input information (e.g., input information 127) may be used by either or both of the reconfiguration engine (e.g., engine 110) or the remote expert technician to identify the one or more legacy machines (e.g., one or more of legacy machine 200), as well as any other features or characteristics of the machines, the manufacturing or assembly environment (e.g., environment 300), product (e.g., product 400), etc. that might be relevant to the generation of the reconfiguration instructions (e.g., instructions 105). The reconfiguration information library (e.g., library 115) used to provide or assist in such identification may be populated with information associated with a plurality of legacy machines that have previously been reconfigured. The reconfiguration engine may be configured to search this library of information and identify relevant information for a current reconfiguration event of a legacy machine. In a manufacturing or assembly environment comprising one or more legacy machines needing reconfiguration, each legacy machine operational therein may be identified, for example, by serial number, model number, type, etc. The identification information may be obtained from the machine itself from acquired images or video, from the review of associated documentation, searching to find third-party information or the like. Still further, pictures or video developed by the user or a technician may be uploaded for identification by an image identification process associated with the reconfiguration engine and/or by a remotely located expert technician. Information related to correct or incorrect identification of a legacy machine may be incorporated as information for use by the reconfiguration engine 110 in subsequent reconfiguration events for other legacy machines. For example, such information may be used in training sets having use in subsequent reconfiguration events.

In accordance with various exemplary embodiments of the present disclosure, a user or technician (e.g., user or technician 500) may input information associated with each legacy machine potentially needing reconfiguration (e.g., one or more of legacy machines 200) into a workflow delivered via an app operational on a device associated with the user or technician. Instructions given via the workflow provided on the app-enabled device, a user may be guided to enter specification information about each legacy machine that is of interest for reconfiguration, including images or video. The use of a workflow may better ensure that any information obtained by the user or a technician at the site of the manufacturing or assembly environment may be adequately recorded before incorporation into the reconfiguration information library (e.g., library 115). In accordance with other exemplary embodiments, a trained person, such as an expert technician or a properly trained human (e.g., user or technician 500), may index information before incorporation thereof into the reconfiguration information library. Yet further, at least some information already included in the reconfiguration information library may be validated by an expert technician or a trained human. The workflow app is associated with the reconfiguration engine (e.g., engine 110) in that the engine may generate the specific user instructions, or a separate app may be associated with the reconfiguration engine 110.

While present in the manufacturing or assembly environment, a user or a technician (e.g., user or technician 500) may be provided with instructions for collecting the information relevant to the reconfiguration event via images, videos, text, written instructions etc. to assist in identifying aspects of each legacy machine pertinent to the reconfiguration engine processes herein. Besides input information (e.g., input information 127) associated with each of the legacy machines needing reconfiguration, input information may be generated about the manufacturing or assembly environment (e.g., environment 300), among other things. Other input information about the manufacturing or assembly ecosystem in which the legacy machine(s) are incorporated may also be useful in generating a workflow, for example, type of finished product(s) (e.g., product 400) that are the output of a process in which the machine(s) are used, as well as other characteristics of the environment in which the machine(s) are used and the finished product(s) are manufactured or assembled.

The images may be acquired by a handheld mobile device or by a wearable device. In some exemplary embodiments, instructions for information capture provided by the reconfiguration engine (e.g., engine 110) may be supplemented by a remote expert technician (e.g., user or technician 500) who is available by real-time video via a mobile device or the like. In various exemplary embodiments, input information provided by the expert technician (e.g., input information 127) may be recorded to identify where reconfiguration instructions (e.g., instructions 105) generated by the reconfiguration engine may be improved.

Image, video, and verbal information acquired in a reconfiguration event may be analyzed to extract relevant information in the reconfiguration information library (e.g., library 115). For example, image information may be derived by computer vision and object identification techniques known today or will become available in the future. Audio information may be identified via keyword identification of information types, categories, etc. that are associated with a reconfiguration event, the planning or design thereof, and/or ongoing monitoring of a completed reconfiguration of one or more legacy machines operational in a manufacturing or assembly environment (e.g., one or more of legacy machines 200 within manufacturing or assembly environment 300).

The input information (e.g., input information 127), such as user instructions, associated with information collected in the manufacturing or assembly environment (e.g., environment 300) may also include environment or location-specific information. Such manufacturer or location-specific information may be useful to assist a user or a technician (e.g., user or technician 500) who is not familiar with the manufacturing or assembly environment or the legacy machine. For example, before a technician visits a facility, images or videos of a subject manufacturing or assembly environment may be provided to the user or technician or to an expert technician who may be assisting the user or technician to prepare for the visit to the manufacturing or assembly environment. Diagrams associated with the operation and layout of the manufacturing or assembly environment may also be provided. Information about the availability of broadband internet, cellular communication, etc. may also be provided. Diagrams showing the layout of various machines may be useful, as well as information about the manufacturing or assembly process and any environmental-related conditions in the manufacturing or assembly environment. An information generation workflow for that manufacturing or assembly environment may be augmented with manufacturer or location-specific information to assist the user or a technician with information capture in generating the reconfiguration event information. This additional information capture may enhance the current reconfiguration event and enrich the reconfiguration library content for subsequent reconfiguration events.

As noted, entry of at least some specific information (e.g., input information 127) about one or more legacy machines in a manufacturing or assembly environment (e.g., one or more legacy machines 200 within manufacturing or assembly environment 300) may be input by a user from information obtained from the location, and that information may be used to derive information about one or more relevant aspects of that legacy machine from third party websites etc. In other cases, input information about one or more legacy machines needing reconfiguration and any additional information pertinent to the reconfiguration event may be available in a manufacturer's internal databases or written records that may be searched for input into the legacy machine reconfiguration database. In some cases, detailed information about a specific legacy machine needing reconfiguration may be available in searchable online databases, such as manufacturer information etc. that may be included in user manuals or other information from the manufacturer or third-party sources. In some situations, written information about the legacy machine may be located in written materials available in a manufacturer's internal records. Such information may be input manually, or OCR may extract the information from a written document. The workflows generated from the reconfiguration engine (e.g., engine 110) and, in various exemplary embodiments, by a remotely located technician (e.g., user or technician 500) may assist in identifying and entering the information needed for a specific legacy machine and any associated manufacturing or assembly environment and process information.

Some relevant information about one or more legacy machines needing reconfiguration (e.g., one or more of legacy machines 200) may be unavailable due to the absence of either online or internal records. A user may then be provided with instructions to identify relevant aspects of a legacy machine that are typically associated with data collection suitable for that type of machine. The user or technician (e.g., user or technician 500) may be provided with images or videos to identify relevant areas, hardware location/type, etc. In some exemplary embodiments, the user or technician may request real-time assistance from a remote expert technician to generate pertinent information from a legacy machine. Any generated information may be provided as input information to the reconfiguration engine (e.g., input information 127 provided to reconfiguration engine 115) to search for existing information associated with a reconfiguration engine database to determine whether reconfiguration instructions (e.g., instructions 105) already exist for that legacy machine or whether that machine requires the generation of reconfiguration instructions.

When relevant information about a manufacturing or assembly environment comprising one or more legacy machines in need of reconfiguration is suitably generated (such as relevant information about manufacturing or assembly environment 300 and its associated legacy machines 200), the reconfiguration engine (e.g., engine 110) may return a plan or design (e.g., reconfiguration plan 130) for reconfiguration of the legacy machines and any associated modifications that are appropriate for modernization of the environment. The reconfiguration engine and/or the remote expert technician (e.g., user or technician 500) may generate reconfiguration instructions (e.g., instructions 105) for installing and configuring any needed hardware, and software may be generated by the reconfiguration engine and/or the remote expert technician. Testing instructions (e.g., testing instructions 107) may also be provided for testing one or more already reconfigured legacy machines.

The design or plan (e.g., reconfiguration plan 130) may include hardware requirements, labor requirements for installation and testing, costs, time requirements, and other associated information. For example, the reconfiguration engine may ingest input information about the one or more legacy machines present in a manufacturing or assembly environment of interest (e.g., engine 110 receiving and processing input information 127 concerning one or more legacy machines 200 of manufacturing or assembly environment 300), and an estimate of the cost and time associated with reconfiguration thereof may be returned. For manufacturers seeking to understand better what will be needed to reconfigure their manufacturing or assembly environment, such an estimate may allow better planning. An owner or manager of the manufacturing or assembly environment may then approve or disapprove the generated legacy machine reconfiguration plan or design against any internally generated specifications, budgets, expectations, etc.

In some manufacturing or assembly environments, one or more legacy machines may be more influential in or generate a more significant influence or effect on the subject manufacturing or assembly process than others. To this end, the methodologies described herein may also include selecting a legacy machine to be reconfigured first, second, third, etc., or even not at all. For example, the generation of data from a legacy machine that does not significantly influence or affect a manufacturing or assembly process or a product (e.g., product 400) that is an output of the process may make identification of actual effects or influences included in real-time operational data derived from other legacy machines more challenging to process. Yet further, the system (e.g., system 100) may generate a recommendation for what legacy machines in a manufacturing or assembly environment should or should not be reconfigured and in what order should the reconfiguration be done if an ordering is relevant (e.g., cost, return on investment as a function of time, manufacturing interruptions, labor requirements, etc.).

In some situations, a determination may be made that the legacy machine reconfiguration information library (e.g., library 115) does not yet comprise information associated with a specific legacy machine in need of reconfiguration (e.g., one of legacy machines 200) and that the necessary reconfiguration instructions (e.g., instructions 105) for that legacy machine may not be derivable from the reconfiguration engine (e.g., engine 110) with the information that is currently available. This recognition may determine that the reconfiguration will need to be conducted as a customized reconfiguration design or plan by one or more technicians having the requisite expertise. In this case, an owner or manager of that manufacturing or assembly environment may decide that the effort and risks associated with reconfiguration of that legacy machine at that time are not justified. Consider the situation where a different manufacturer expends the effort to reconfigure a legacy machine of the same or similar type at a future date. In that case, the reconfiguration engine may be configured to notify the first manufacturer that information now exists to efficiently reconfigure its legacy machine, potentially at a lower cost and in a faster time. As would be appreciated, the reconfiguration team may incorporate the relevant reconfiguration information during their work with the other manufacturer.

Reconfiguring a legacy machine (e.g., one of legacy machines 200) to generate real-time operational data should be cost-effective in the context of that legacy machine, as well as the overall manufacturing or assembly environment, such as environment 300. If an upgrade to an existing system would cost more than the benefits conferred by the reconfiguration, reconfiguration might be contraindicated. On the other hand, even a complicated and expensive reconfiguration could be justified if substantial cost, efficiency, and/or product quality enhancements are significant. Information derivable from third-party legacy machine reconfigurations may provide such cost/benefit information so that a manufacturer may make a reconfiguration decision based on actual data instead of making assessments based on educated guesswork. In this regard, the present disclosure also incorporates a determination of a cost savings that may be generated over a period of time, for example, over one, or two, or more years.

Notably, the collection of legacy machine information from a plurality of manufacturing or assembly environments in a systematic and analyzable format may provide value to a provider of reconfiguration services even if a manufacturer does not purchase its services. If that manufacturer decides not to move forward with a legacy machine reconfiguration process, information acquired from that location may still be helpful to enrich the reconfiguration information library (e.g., library 115) for use in other reconfiguration events. In short, each request for proposal associated with a manufacturing or assembly environment reconfiguration may enhance the content of the reconfiguration information library. Moreover, rather than requiring a reconfiguration contractor to visit a manufacturing or assembly environment location in person to generate a suitable reconfiguration proposal that may not be accepted, the reconfiguration engine (e.g., engine 110) may allow the reconfiguration contractor to develop a meaningful proposal with much less effort and cost.

Audits of manufacturing or assembly environments vis-à-vis the one or more legacy machines (e.g., one or more of legacy machines 200) operational therein may also be generated. For example, a manufacturer interested in understanding the nature and content of a plurality of legacy machines active in its environment may utilize the reconfiguration engine functionality to understand better what legacy machines are operational in its entire network. Information derived therefrom may generate a system-wide design or plan (e.g., reconfiguration plan 130) for reconfiguring a plurality of legacy machines operational in the system, where the system may comprise one or a plurality of individual manufacturing or assembly environments. Audit information may also allow the manufacturer to acquire information associated with a cost for upgrading one or more manufacturing or assembly environments with modern—or "smart"—machines therein.

As noted, once a legacy machine in a manufacturing or assembly environment has been suitably identified (such as one of legacy machines 200 within manufacturing or assembly environment 300), and a reconfiguration plan or design has been generated and accepted by a manufacturer (e.g., reconfiguration plan 130), instructions for installing appropriate hardware and software for a legacy machine or collection of machines may be generated by the reconfiguration engine (e.g., engine 110) and/or the remote expert technician. Reconfiguring a manufacturing or assembly environment typically involves one or more legacy machines operational in a manufacturing or assembly environment being configured with the suitable connectors, protocols, and firmware on a machine connection side to allow the real-tire operational data collection to be obtained therefrom. A majority, if not most, legacy machines 200 in use today may comprise functionality, typically PLC, that may provide connection via a gateway device that allows operational data to be communicated to a computing architecture associated with the manufacturing or assembly environment. When a legacy machine is configured with PLC, the reconfiguration engine and/or a remote expert technician (e.g., user or technician 500) may determine what hardware and/or software is needed to configure that machine for data output. Such generated information may be configured as instructions provided to a user associated with the reconfiguration of the subject machine, for example an employee or a technician associated with a reconfiguration event. As discussed previously, a wide variety of PLC protocols may be operational on legacy machines.

In accordance with various exemplary embodiments of the present disclosure, the reconfiguration engine (e.g., engine 110) and/or a remotely located technician (e.g., user or technician 500) may determine that a PLC-enabled legacy machine may be configured to directly communicate with a gateway device operable to transfer operational data directly for processing in a manufacturing analytics program. For example, some PLC-enabled legacy machines use standard protocols like OPC UA, EthernetIP, Modbus TCP/IP, Profinet, or other protocols that may be processed by simply transferring the data through a gateway device in its native form. Multiple legacy-machine generated data streams may be processed as a collection, as well as other legacy machine data streams based on the same protocol, without a data integration step as discussed hereinafter. In some exemplary embodiments, code running on a PLC-enabled legacy machine may need to be modified or translated via a data integration step, for example, a process operational on an IIoT gateway device having the capability of processing that type of protocol as discussed hereinafter, to make the legacy machine-generated data available as output data that may be meaningfully processed as a collection with other data in a manufacturing data analytics program operational in a cloud computing environment.

Each of the characteristics and features associated with a legacy machine reconfiguration may be evaluated, and the reconfiguration engine (e.g., engine 110) and/or expert technician (e.g., user or technician 500) may return relevant reconfiguration instructions (e.g., instructions 105) related thereto. Moreover, features and characteristics of other legacy machines operational in a manufacturing or assembly environment (e.g., environment 300) should also be considered. Yet further, features and characteristics associated with the specific manufacturing or assembly environment and the product (e.g., product 400) that is the output of a manufacturing or assembly process may also be evaluated. In short, there are often many variables to be considered in each legacy machine reconfiguration event. When a previously reconfigured legacy machine and associated manufacturing or assembly environment may be mirrored or at least referred to provide information relevant to the generation of subsequent reconfiguration instructions for a PLC-functionality for use in the following legacy machine reconfiguration event, the previously generated reconfiguration information may be practical to streamline subsequent reconfigurations.

The legacy machine reconfiguration engine 110 (e.g., engine 110) may be configured to identify at least one suitable gateway device (e.g., IIoT gateway device, etc. as discussed hereinafter) to obtain real-time operational data from one or more PLC-enabled machines and from any associated sensors or smart devices that may be operational in the manufacturing or assembly environment, such as environment 300. Alternatively, such gateway device identification may be generated or validated by a remote technician who optimally is an expert (e.g., user or technician 500). An expert technician located remotely to the manufacturing or assembly environment 300 may also validate the gateway device selection made by the reconfiguration engine or a non-expert technician, such as an IT expert who does not have OT expertise. Notably, the expert technician validation may not only be highly relevant for ensuring that the current legacy machine reconfiguration is correctly executed, but the expert technician validation may also ensure that any information incorporated in the reconfiguration information library (e.g., library 115) from that reconfiguration event may also be valid for use in subsequent reconfiguration events. As the reconfiguration information library becomes more enriched with information derived from multiple reconfiguration events, an expert technician may be less likely to reject information generated by the reconfiguration engine since the reconfiguration engine may be less likely to return invalid instructions. However, to ensure that information incorporated in the reconfiguration information library remains correct in the future, at least some expert technician review of the reconfiguration information included in the library will be beneficially conducted from time to time.

Returning to the methodology from which a real-time legacy machine data stream may be obtained from a legacy machine (e.g., one of legacy machines 200), an IIoT gateway device is often specified for use with PLC-enable legacy machines. Still, other methods/devices may be appropriate in the context. Types of gateway devices selectable for use in the reconfiguration of a legacy machine may comprise, for example:

PLC IIoT gateway device: a physical device and/or software program that serves as the connection point between PLC-enabled machines, as well as any other "smart" devices (e.g., sensors, etc.) operational in a manufacturing or assembly environment, such as environment 300. Data moving from a PLC-enabled machine to the cloud will travel through the IIoT gateway device. If the data processing is conducted on the IIoT device before sending it to the cloud, the gateway device comprises edge computing capabilities.
  PLC gateway (aka "protocol converter"): a network entity configured to join dissimilar systems for use in various industrial automation applications, such as, as a bridge between two PLC-enabled machines from different brands. PLC gateway devices may provide an out-of-the-box solution that in most cases requires no programming, virtually no commissioning, and easy maintenance. The PLC gateway device may be engaged with a computer or server located onsite.
  Cellular router: a router that may connect a PLC-enabled legacy machine to the internet using a cellular connection. It has a built-in modem to connect a PLC-enabled device to the internet. This type of router is typically used in case of network restrictions (imposed by factory owners when PLCs are not prohibited from using the business internet connection) or in remote off-site locations in the field. Sometimes it is used as a backup when having an unstable wired internet connection and continuous internet access is needed. As 5G cellular communications become more ubiquitous, cellular device routers may become more prevalent.
  Industrial VPN router: a router configured for PLC standard router where VPN software is configured with every legacy machine before connecting that machine to a network associated with the manufacturing or assembly environment, such as environment 300. This connection may not be sharable with other devices on that network.

Integrating the sensors into the PLC or the local edge devices and then transmission to local usage via HMI or SCADA or to populate a cloud-based dashboard has some considerations to new and legacy machine designs. Each connection of smart devices may have a scan time that adds to the overall latency of the data as it is collected and presented or used in its final state. Another consideration is the network burden of the selected industrial communications protocol's physical layer as they are finite. The reconfiguration engine (e.g., engine 110) may include functionality to consider all of the relevant elements to plan and test the newly created mixed density system for effective transmission in real-time and the effectiveness of the data associated with the collection as applicable to the user's process needs.

Referring specifically to an IIoT gateway device, this hardware device may be configured with either cloud or edge computing models or an applied hybrid computing model. With a cloud model, it is possible to achieve a centralized computing solution that handles data analysis—but at the cost of generating processing latency. An edge computing device may be beneficial in a manufacturing or assembly environment (e.g., environment 300) where a large amount of real-time data is acquired. Edge computing brings resources to the deployed IIoT device or legacy system using a decentralized model. Beneficially in industrial operations, an edge-configured IIoT gateway device may reduce latencies in operational data transfer, thereby better ensuring that data is provided from the legacy machines (and other devices operating In the manufacturing or assembly environment) substantially in real-time. A hybrid approach may allow flexibility as needed.

Selecting a gateway device suitable for a specific manufacturing or assembly environment with one or more legacy machines operational therein (e.g., one or more of legacy machines 200 operational within environment 300) may be a key performance indicator for a reconfiguration event. This may serve as the framework by which legacy machine data is derived and readied for processing. Thus, the ability to generate a selection or recommendation of one or more gateway devices from a plurality of prior reconfiguration events may be expected to improve overall reconfiguration outcomes, primarily when follow-up results of previous reconfiguration events may be used to tune the reconfiguration engine selections.

The selection of a gateway device for a legacy machine (e.g., one of legacy machines 200) may be affected by the features and characteristics of a specific manufacturing or assembly environment (e.g., environment 300), manufacturing or assembly process, and the product(s) that are the output (e.g., product 400). Consider whether the manufacturing or assembly environment comprises high/low temperatures, humidity, vibrations, dust, etc. In such a case, different types/varieties of gateway devices may need to be used, such as those configured explicitly with features designed to enhance usage in harsh industrial environments.

Information derived from the success or failure of componentry installed in third-party manufacturing or assembly environments may be used to define a selection of a gateway device that is appropriate for use in a subsequent reconfiguration event. For example, if an IIoT gateway device from Supplier X is found to have failed in a commercial bakery operating in a hot and humid location, the reconfiguration engine (e.g., engine 110) may not recommend that same gateway device for another commercial bakery operating in a similarly hot and humid area, even when a manufacturer's IIoT gateway device specifications would otherwise indicate that the device would suitably meet the second bakery's needs.

Size may also be a consideration for the selection of a specific gateway device. Since a gateway device is an add-on to an existing system, the amount of available space for additional componentry might be limited, which means that a reconfiguration solution should take up as little space as possible. Because such space constraints may limit the functionality of added hardware in such an application, it may be beneficial for the gateway device to have a flexible form factor and allow for configuration as needed.

A manufacturing facility location may also be where a suitably reliable and robust broadband internet connection is unavailable. In this situation, it may be beneficial to configure a cellular router as part of the reconfiguration process, either as a primary source of data collection and transfer or as a backup to an IIoT gateway device if there is neither a reliable broadband connection nor a cellular connection, a PLC converter connected to an onsite computer or server may allow real-time operational data to be collected for later analysis.

Security needs may also be relevant in selecting a gateway device for reconfiguring one or more legacy machines, such as one or more of legacy machines 200. While IIoT gateway devices may be configured to prevent cyber-attacks using appropriate IT security protocols, in some cases, it may be necessary to further secure the manufacturing or assembly environment, such as by wholly isolating it from other parts of the manufacturer's business. An industrial VPN router may connect each legacy machine to a private and highly secure network without the need to install and configure VPN software on each legacy machine (which may not even be a possibility). All connected PLC controllers associated with legacy machines, as well as any other machines that may be operational with a manufacturing or assembly environment (e.g., industrial robots, human-machine interface, machine vision cameras, etc.) configured behind the router may simultaneously communicate data to the private network and are thus protected from the Internet via the built-in router firewall. This way, an unauthorized third party may be prevented from accessing an individual machine or the manufacturing network. Even if someone were to gain unauthorized access to a company's business networks, they may be prevented from accessing the machines operational in the manufacturing or assembly environment.

The country or region in which the manufacturing or assembly environment is located and the legacy machines originate may also be relevant to selecting a gateway device to derive real-time operational data from a PLC-enabled legacy machine, such as a PLC-enabled one of legacy machines 200 operating within manufacturing or assembly environment 300. To this end, different protocols or standards may be associated with machines designed for use in a specific region or country. Thus, selecting a device gateway for use in a manufacturing or assembly environment might also include information associated with the original design specifications of a PLC-enabled legacy machine vis-à-vis its native programming and any updates generated since it was brought online.

Before returning a selection of one or more gateway devices for use with one or more legacy machines operational in a specific manufacturing or assembly environment (e.g., one or more legacy machines 200 operational within manufacturing or assembly environment 300), the reconfiguration engine (e.g., engine 110) may be configured to query for the manufacturing or assembly environment and/or the manufacturing or assembly process characteristics and features previously identified to be associated with selection of a gateway device appropriate for that type of legacy machine and/or the specific manufacturing or assembly environment. In a non-limiting example, questions that may be relevant to the selection of an appropriate gateway device for a particular manufacturing or assembly environment may comprise, for example:

- How will the heat, steam, grease, dust, or water etc. produced in the manufacturing or assembly environment affect a gateway device?
- Do the systems and equipment in this manufacturing or assembly environment need custom-designed hardware to ensure it fits into or on the machine's complex structure?
- Do technicians, workers, or managers need to communicate with the gateway devices?
- What types/levels of security are needed? Is there concern about industrial espionage or ransomware attacks that could take down a manufacturer's infrastructure because of the types of products being manufactured, the nature of the industry, or the location of a manufacturing facility? Is there a need to isolate the manufacturing functions from other aspects of a manufacturer's business operations?
- Are there any communications limitations or protocol specifications relevant to the region or location where the manufacturing or assembly environment is located?
- Has the same or similar legacy machine been configured with a specific gateway device in a previous reconfiguration event? If so:
  - Did it succeed or fail?
  - What were the conditions of the manufacturing or assembly environment?
  - What was the nature of the manufacturing or assembly environment?
  - What was the manufacturing or assembly process?
  - What products were the output of a manufacturing or assembly process?

In less common situations, a vintage legacy machine operational in a manufacturing or assembly environment (e.g., a vintage one of legacy machines 200 operational within manufacturing or assembly environment 300) may not comprise any data output functionality whatsoever, or any data input/output functionality may be operational via obsolete/unsupported proprietary communications elements. Identifying a legacy machine with no useable data output functionality may trigger a query from the reconfiguration engine (e.g., engine 110) of whether the same or similar legacy machine has previously been reconfigured. In such a case, relevant instructions or other information may be delivered to an owner, a manager, or a contractor capable of reconfiguring that legacy machine. If that legacy machine has not previously been reconfigured, the library may be searched for information associated with the configuration of similar legacy machines. A contractor or expert technician having the skills needed to reconfigure that legacy machine may also be identified from the list of persons with abilities associated with a legacy machine requiring reconfiguration. If that manufacturer elects to move forward with the reconfiguration of that legacy machine, information associated with that reconfiguration may be incorporated in the reconfiguration library to streamline subsequent reconfigurations of the same or similar legacy machines.

In addition to selecting a device gateway and other relevant hardware for use in a reconfiguration event, the reconfiguration engine (e.g., engine 110) may also be configured to generate instructions for installing the gateway device(s) to properly configure the PLC-enabled legacy machines for generation and collection of real-time operational data. The installation instructions may take into consideration specific features or characteristics of the manufacturing or assembly environment (e.g., environment 300), such as the configuration and usage characteristics of a legacy machine (e.g., one of legacy machines 200) and the manufacturing or assembly environment, the product(s) being made in a manufacturing or assembly process (e.g., product 400), and any other relevant information that may ensure correct installation and operation of the reconfigured legacy machines. Beneficially, the expert technician (e.g., user or technician 500) may assist in the reconfiguration engine identification of the steps or tasks needed to appropriately install and test the hardware and software implemented in a reconfiguration event. Such assistance may be via a real-time video stream generated by a user or technician at the location of the manufacturing or assembly environment during installation of the hardware and software and any testing thereof. The remote expert technician may provide direction to the user or a non-expert technician who is at the location of the legacy machines to acquire images or videos.

The legacy machine reconfiguration information library (e.g., library 115) may be configured to analyze each of the data streams generated from one or a plurality of legacy machines (e.g., one of legacy machines 200) to determine whether a data integration step may be needed to enable the processing of data streams as real-time operational data for use in a manufacturing data analytics process. If a data integration step is required, the reconfiguration engine (e.g., engine 110) may be configured to select a data integration method from a library of available data integration methods. Typically, integration of multiple data streams built on different protocols, languages, or architectures may be accomplished using an extract, transform, and load ("ETL") methodology. Generally, the ETL processes may be operational within the computing environment, such as by association with an IIoT gateway device in real-time as in an edge computing model. In some exemplary embodiments, the collected data stream may be transferred to the cloud server for integration in a cloud server or a combination of edge and cloud computing models via the hybrid approach. The ETL data integration functionality may be custom-generated processes or selected from third-party software offerings (e.g., "middleware").

Consider the situation where a suitable data integration method for that legacy machine data type has not previously been generated and validated for use. In such a case, a person associated with the management of the reconfiguration database may be notified. This person may be tasked with providing a suitable integration process, such as by creating one in the first order or by selecting one from a third-party source (e.g., GitHub, etc.). The reconfiguration engine (e.g., engine 110) may assist in the generation and/or testing of a suitable data integration process. Once a suitable data integration process is selected or generated for that legacy machine data type, the reconfiguration engine may be updated, and that method may be deployed in future reconfiguration events as appropriate.

As with the other identifications associated with the reconfiguration methodology herein, an expert technician (e.g., user or technician 500) may validate the ETL process to ensure that the selected method is correct for a current reconfiguration event and that any information is incorporated in the reconfiguration engine for subsequent use (e.g., information incorporated within reconfiguration engine 110) is also correct. Beneficially, the selection and, if applicable, operation of a data integration method vis-à-vis the legacy machine operational data type may be tested from time to time to ensure that the data integration generates a cohesive and coherent collection of real-time operational data after the reconfiguration event. If updates or modifications are needed, these may be deployed to any legacy machines previously associated with that data integration method.

In addition to any real-time operational data derived from each legacy machine (e.g., each of legacy machines 200), other information associated with the manufacturing or assembly processes may be relevant to generating insights from real-time operational data generated from a plurality of legacy machines related to a manufacturing or assembly process. For example, one or more sensors may be configured to measure environmental conditions, track an ingredient's or component's progress through a production line, monitor a partially or completed product (e.g., product 400) at one or more steps in the manufacturing process, among other tasks. Such manufacturing-related data may be collected from sensors configured with one or more machines or separately configured data capture elements. For example, temperature and humidity sensors may be present at one or more locations in a manufacturing or assembly environment (e.g., environment 300), and data generated therefrom may be communicated via WIFI, Bluetooth, etc., for evaluation with real-time operational data derived from the manufacturing or assembly processes. Yet further, a photo-eye sensor may be engaged with an assembly line to obtain counts of objects of interest, for example, ingredients, components, or products on a production line. Cameras configured with computer vision capabilities may also be used. In this regard, a camera configured to identify an ingredient, component, or product may enhance operational data obtained from the machines.

The reconfiguration engine (e.g., engine 110) may determine whether any operational data generated from sensors or devices associated with one or more legacy machines (e.g., one or more legacy machines 200), the manufacturing or assembly environment (e.g., environment 300), or a product output (e.g., product 400) needs to be converted or translated to make it processible as a collection in a manufacturing data analytics program. Generally, however, data integration of modern sensors or information generated from other devices may be less problematic than with legacy machines. To this end, smart sensors typically operational in a manufacturing or assembly environment may be configured in a modern data format capable of being integrated with other data streams for analysis. For example, inexpensive environmental sensors (e.g., temperature, humidity, etc.) may export data in formats that are capable of being evaluated in conjunction with other data derivable from the processes described herein, for example, csv data. Data captured images processed by computer vision algorithms may be expected to be formatted using languages, protocols, and/or architectures suitable for use as real-time data herein. For example, object identifications or other relevant recognition tasks derived from images or video generated from a manufacturing or assembly process using computer vision techniques may be exported in csv format.

The data derived from the real-time operation of one or more reconfigured legacy machines in a manufacturing or assembly process (such as one or more of legacy machines 200), as well as real-time data generated from sources other than these machines, may suitably be configured to allow the analysis of each data stream collectively in a manufacturing data analytics program and/or environment. The integrated collection of real-time operational data may be analyzed using any suitable data analytics program. Non-limiting examples include SAS, SAP Analytics Cloud, IBM SAP Analytics Cloud, MatLab, etc. Such collection of real-time operational data allows evaluation of the process substantially as a whole, instead of consolidation of individual data generated from independent data streams generated from each legacy machine.

Legacy machine operational parameters, features, or characteristics actually or potentially relevant to a manufacturing or assembly process may be associated with each machine, output product, or any parameter for which real-time data may be included in the integrated data collection for analysis in a manufacturing analytics program. For example, at least the following manufacturing or assembly process-associated parameters may be of interest in context:
 the specific operation of a legacy machine
 the particular operation of two or more legacy machines concerning each other
 influences or effects of one or a plurality of legacy machines on one or more aspects of interest in a manufacturing or assembly process in which the legacy machines are operational
 influences or effects of one or a plurality of legacy machines one or more aspects of a product that is an output of the process (e.g., compliance with one or more compliance-related metrics)
 influences or effects of one or more environmental conditions on one or more legacy machines operational in the manufacturing or assembly environment
 influences of one or more ingredients or components on one or more of the legacy machines operational in the manufacturing or assembly process After completing a legacy machine reconfiguration event for a manufacturing or assembly environment incorporating one or more legacy machines (e.g., environment 300 incorporating legacy machines 200), a user may also acquire additional images or videos of the legacy machine and the manufacturing or assembly environment. Instructions associated with an after-action information collection may better ensure that information about relevant aspects of the completed reconfiguration event are acquired for subsequent use.

As with other information collection, a workflow may assist in information collection and better ensure appropriate information indexing for subsequent use in the reconfiguration information library (e.g., library 115). A human may also review any acquired information to enhance the validity thereof. Suppose the reconfiguration of the legacy machine and other relevant aspects of the reconfiguration event was correctly conducted. In that case, acquired images or videos may be used as "go-bys" (with any confidential information deleted or masked) to be included as instructions used in subsequent reconfiguration events having similar legacy machines, manufacturing or assembly environments, products, etc. in a situation where it is later found that there is an actual or potential problem with reconfiguring one or more legacy machines in a reconfiguration event. In that case, the images or videos may be evaluated to obtain relevant information before dispatching a technician to the manufacturing or assembly environment location.

Various insights may be generated from the processing of the collection of real-time data in a data analytics program fully or partially operational in a cloud computing environment. As would be appreciated, the information that may be of interest may be based on a parameter of interest to an owner or manager of the manufacturing or assembly environment (e.g., environment 300) and any third parties interested in the generated insights. Examples of insights and improvements derivable from a real-time collection of operational data may include, for example:
 Improved energy efficiency
 Lower operating costs resulting from predictive maintenance.
 Improved equipment reliability and reduced downtime
 Reduce scrap and increase production yield
 Optimized performance due to production flow automation.
 Remote asset management-tracking equipment condition, performance, potential damage, and performance bottlenecks
 Real-time, automated production flow optimization aimed at cutting waste
 Product quality control at different stages of production flow
 Employee safety-worker protection and accident prevention
 Security and access control, e.g., biometric authentication systems In accordance with various exemplary embodiments of the present disclosure, data associated with each ingredient or component used in a manufacturing or assembly environment (e.g., environment 300) and any specifications for one or more products that may be an output of the manufacturing or assembly process (e.g., product 400) may be integrated into information relevant to the real-time operation of the legacy machines (e.g., legacy machines 200). Data associated with one or more compliance-related metrics for a product that is the output of a manufacturing or assembly process may also be integrated with the real-time operational data. Data associated with a source of ingredient or component supply may be combined with the real-time operational data to analyze influences or effects of different ingredients or components on one or more legacy machines, the manufacturing or assembly process, and/or the output product of the process. Changes in one or more compliance-related product metrics may be analyzed to determine whether such changes generate an influence or effect on the manufacturing or assembly process or the legacy machines operational therein. For example, a change in an ingredient or component supplier may introduce variations in the operation of the legacy machines in the manufacturing or assembly process. A change in product features or characteristics may introduce unexpected stresses in a legacy machine operational in the manufacturing or assembly process. Operational data derived from any aspect of the manufacturing or assembly environment (e.g., environment 300) may also be integrated with enterprise resource platforms, customer relationship management platforms, etc.

In accordance with other exemplary embodiments of the present disclosure, ongoing monitoring of the reconfigured legacy machines operational in unrelated manufacturing or assembly environments may be provided to compare the operation and performance of legacy machines present in unrelated manufacturing or assembly environments. After-the-fact monitoring may identify problems resulting from the reconfigurations and/or opportunities for the adjustment that may improve ongoing legacy machine data collection.

Figure 2:
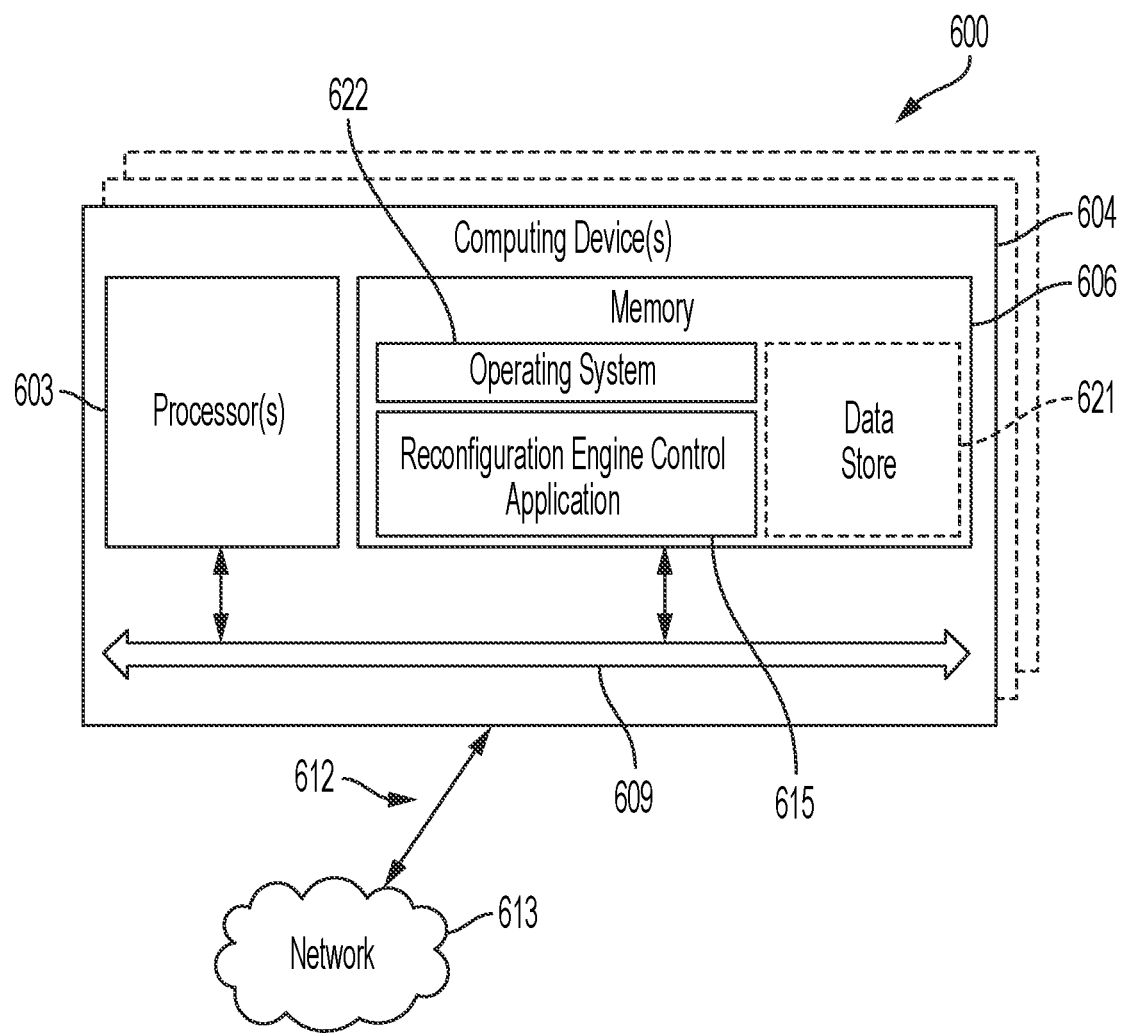
FIG. 2 is a schematic diagram illustrating an exemplary processing (or computing) device for control of a reconfiguration engine, in accordance with various exemplary embodiments of the present disclosure.

Referring now to FIG. 2, there is shown a schematic diagram illustrating an example of a processing (or computing) device 600 that can be used to control the functions of a reconfiguration engine, such as, for example, reconfiguration engine 110, in accordance with various embodiments of the present disclosure. The processing (or computing) device 600 can comprise one or more computing/processing devices 604 such as, e.g., a computer, controller, smartphone, tablet, etc. The processing (or computing) device 600 may include processing circuitry comprising at least one processor circuit, for example, having a processor 603 and a memory 606, both of which are coupled to a local interface 609. The local interface 609 may comprise, for example, a data bus with an accompanying address/control bus or other bus structure as can be appreciated.

In accordance with various embodiments, the processing (or computing) device 600 may include one or more network interfaces 612. The network interface 612 may comprise, for example, a wireless transmitter, a wireless transceiver, and/or a wireless receiver. The network interface 612 communicates to a remote computing/processing device or other components of an external network 613 using, e.g., a Bluetooth, WiFi, or other appropriate wireless protocol. As one skilled in the art will appreciate, other wireless protocols may be used in the various embodiments of the present disclosure. The network interface 612 may also be configured for communications through wired connections.

Stored in the memory 606 are both data and several components that are executable by the processor(s) 603. In particular, stored in the memory 606 and executable by the processor 603 may be reconfiguration engine control application(s) 615 which may, e.g., control operation of one or more reconfiguration engines disclosed herein, and potentially other applications. In this respect, the term "executable" means a program file that is in a form that can ultimately be run by the processor(s) 603. Also stored in the memory 606 may be a data store 621 and other data. In addition, an operating system 622 may be stored in the memory 606 and executable by the processor(s) 603. It is understood that there may be other applications that are stored in the memory 606 and are executable by the processor(s) 603 as will be appreciated by those having ordinary skill in the art.

Examples of executable programs may be, for example, a compiled program that is capable of being translated into machine code in a format that is loadable into a random access portion of the memory 606 and run by the processor(s) 603, source code that may be expressed in proper format such as object code that is capable of being loaded into a random access portion of the memory 606 and executed by the processor(s) 603, or source code that may be interpreted by another executable program to generate instructions in a random access portion of the memory 606 to be executed by the processor(s) 603, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may comprise multiple processors 603 and/or multiple processor cores, and the memory 606 may comprise multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, ultrasound or other devices. The processor 603 may be of electrical or of some other available construction.

Although the reconfiguration engine control application(s) 615, and other various applications may be embodied in software or code executed by general purpose hardware as discussed above, as an alternative the same may also be embodied in dedicated hardware or a combination of software/general purpose hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the reconfiguration engine control application(s) 615, that comprises software or code may be embodied in any non-transitory computer-readable medium for use by or in connection with an instruction execution system such as, for example, a processor 603 in a computer system or other system. In this sense, the logic may comprise, for example, statements including instructions and declarations that are capable of being fetched from the computer-readable medium and executed by the instruction execution system. In the context of the present disclosure, a "computer-readable medium" may comprise any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium may include, but are not limited to, magnetic tapes, magnetic floppy diskettes, magnetic hard drives, memory cards, solid-state drives, USB flash drives, or optical discs. Also, the computer-readable medium may comprise a random-access memory (RAM) including, for example, static random access memory (SRAM) and dynamic random access memory (DRAM), or magnetic random access memory (MRAM). In addition, the computer-readable medium may comprise a read-only memory (ROM), a programmable read-only memory (PROM), an erasable programmable read-only memory (EPROM), an electrically erasable programmable read-only memory (EEPROM), or other type of memory device.

Further, any logic or application, including the reconfiguration engine control application(s) 615, may be implemented and structured in a variety of ways. For example, one or more applications described may be implemented as modules or components of a single application. For example, the reconfiguration engine control application(s) 615 may include a wide range of modules such as, e.g., an initial model or other modules that may provide specific functionality for the disclosed methodology. Further, one or more applications described herein may be executed in shared or separate computing/processing devices or a combination thereof. For example, a plurality of the applications described herein may execute in the same processing (or computing) device 600, or in multiple computing/processing devices in the same computing environment. To this end, each processing (or computing) device 600 may comprise, for example, at least one server computer or like device, which may be utilized in a cloud based environment.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method of generating reconfiguration instructions for reconfiguring at least one legacy machine in accordance with a reconfiguration event, the method comprising:
  employing at least one of a computer and a user to identify a manufacturing or assembly environment having the at least one legacy machine, the at least one legacy machine requiring reconfiguration for generation of real-time operational data and reporting capabilities, the reporting capabilities including collection and processing of a real-time data stream derived from operation of the at one legacy machine during a manufacturing or assembly process operational within the manufacturing or assembly environment, the manufacturing or assembly process producing at least one product;
  employing at least one of the computer and the user to collect information associated with each of (i) the at least one legacy machine, (ii) the manufacturing or assembly environment, and (iii) the manufacturing or assembly process; and
  employing at least one of a reconfiguration engine and the user to generate the reconfiguration instructions.

2. The method of claim 1, wherein the at least one legacy machine includes a digital weighing or counting scale.

3. The method of claim 2, wherein the reconfiguration engine is associated with a library of information configured to convert an electrical signal generated by the digital weighing or counting scale into the real-time data stream for processing in a data analytics program operational in a cloud computing environment.

4. The method of claim 1, wherein the reconfiguration instructions include instructions for selection of an Industrial Internet of Things ("IIoT") gateway device having features and characteristics suitable for use in the manufacturing or assembly environment.

5. The method of claim 4, wherein the IIoT gateway device includes edge computing capabilities.

6. The method of claim 4, wherein the IIoT gateway device is configured to communicate with a cloud server, the cloud server configured to process, analyze and store operational and processed data output by the IIoT gateway device, wherein at least some of the operational and processed data is generated by the at least one legacy machine.

7. The method of claim 4, wherein the IIoT gateway device is configured to communicate with a cloud server, the cloud server configured to receive at least one data stream associated with the manufacturing or assembly process.

8. The method of claim 7, wherein the at least one data stream associated with the manufacturing or assembly process is associated with at least one of (i) supply chain information associated with the manufacturing or assembly process, (ii) compliance-related information associated with the product, and (iii) an enterprise resource planning network.

9. The method of claim 1, wherein the user is in real-time video communication with an expert technician.

10. The method of claim 1, wherein the reconfiguration engine includes a reconfiguration information library generated from a plurality of prior legacy machine reconfiguration events.

11. The method of claim 10, wherein the plurality of prior legacy machine reconfiguration events is associated with a plurality of different manufacturing or assembly environments.

12. The method of claim 11, wherein the reconfiguration information library is configured to be updated in accordance with legacy machine reconfiguration information after completion of an associated legacy machine reconfiguration event.

13. The method of claim 1, wherein the reconfiguration engine includes a reconfiguration information library and the collected information includes images or videos of the manufacturing or assembly environment and the at least one legacy machine, the images or videos being stored within the reconfiguration information library for use during subsequent reconfiguration events.

14. The method of claim 1, wherein the reconfiguration engine includes a reconfiguration information library, the method further comprising employing the user to at least partially review the reconfiguration instructions; and storing the reconfiguration instructions in the reconfiguration information library after the user reviews the reconfiguration instructions.

15. The method of claim 1, wherein the at least one legacy machine is configured with programmable logic ("PLC") functionality, and the reconfiguration instructions are generated in accordance with whether an operational data stream generated from each of the at least one legacy machine requires a data integration step before providing the operational data stream to a data analytics program for processing.

16. A system for generating reconfiguration instructions for reconfiguring at least one legacy machine of a manufacturing or assembly environment, the system comprising:

a reconfiguration engine having a reconfiguration information library storing library information related to a plurality of reconfiguration events, the reconfiguration engine configured to receive input information relating to one or more of (i) the at least one legacy machine, (ii) the manufacturing or assembly environment, (iii) a manufacturing or assembly process performed within the manufacturing or assembly environment and (iv) at least one finished product produced by the manufacturing or assembly process, wherein the reconfiguration engine generates the reconfiguration instructions in accordance with the library information and the input information.

17. The system of claim 16, wherein the reconfiguration information library includes a plurality of reconfiguration engine information sets associated respectively with one or more types or classes of legacy machines, the reconfiguration instructions being generated in accordance with at least one of the plurality of reconfiguration engine information sets.

18. The system of claim 16, wherein the reconfiguration engine includes at least one input to receive the input information and at least one output to communicate the reconfiguration instructions.

19. The system of claim 16, further comprising a user, the user verifying or modifying the reconfiguration instructions generated by the reconfiguration engine.

20. The system of claim 19, wherein the reconfiguration engine is configured to receive at least a portion of the input information from the user.

\* \* \* \* \*